(12) United States Patent
Horigome et al.

(10) Patent No.: US 12,134,222 B2
(45) Date of Patent: Nov. 5, 2024

(54) BLOW MOLDING MACHINE, MOLD COMPONENT MOUNTING METHOD AND MOLD UNIT

(71) Applicant: NISSEI ASB MACHINE CO., LTD., Nagano (JP)

(72) Inventors: Hiroshi Horigome, Komoro (JP); Toshio Nakajima, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/902,969

(22) Filed: Sep. 5, 2022

(65) Prior Publication Data

US 2022/0410463 A1 Dec. 29, 2022

Related U.S. Application Data

(60) Division of application No. 17/019,081, filed on Sep. 11, 2020, now Pat. No. 11,465,328, which is a
(Continued)

(30) Foreign Application Priority Data

Oct. 24, 2011 (JP) .................................. 2011-233452
Oct. 19, 2012 (JP) .................................. 2012-231478

(51) Int. Cl.
*B29C 49/28* (2006.01)
*B29C 33/30* (2006.01)
(Continued)

(52) U.S. Cl.
CPC .............. *B29C 49/28* (2013.01); *B29C 33/30* (2013.01); *B29C 49/06* (2013.01); *B29C 49/36* (2013.01); *B29C 2049/4856* (2013.01)

(58) Field of Classification Search
None
See application file for complete search history.

(56) References Cited

U.S. PATENT DOCUMENTS 5,253,999 A 10/1993 Kosuge
5,750,161 A 5/1998 Schock, Jr.
(Continued)

FOREIGN PATENT DOCUMENTS

JP 53128605 4/1980
JP B2-H08-002586 9/1992
(Continued)

OTHER PUBLICATIONS

Japanese Patent Office Action dated Nov. 30, 2016 for Application No. 2012-231478.
(Continued)

*Primary Examiner* — Christopher T Schatz
(74) *Attorney, Agent, or Firm* — David L. Hoffman; Nolan Heimann LLP

(57) ABSTRACT

A blow molding machine includes a support member that supports a mold component and a moving mechanism that moves the support member to a projecting position toward the outside of the machine and to a storing position. The machine includes a first fixed fulcrum shaft. The support member includes a base end portion rotatably supported by the first fixed fulcrum shaft and a free end portion having a first movable fulcrum shaft. The moving mechanism has rotatably interconnected links. One link is rotatably supported by the movable fulcrum shaft. In the projecting position, the links are maintained linearly by a first angle fixing tool to serve as a leg portion that supports the support member's free end portion.

5 Claims, 17 Drawing Sheets

Related U.S. Application Data continuation of application No. 16/043,565, filed on Jul. 24, 2018, now Pat. No. 10,994,466, which is a division of application No. 14/354,066, filed as application No. PCT/JP2012/077275 on Oct. 22, 2012, now Pat. No. 10,052,809.

(51) Int. Cl.
    *B29C 49/06*     (2006.01)
    *B29C 49/36*     (2006.01)
    *B29C 49/48*     (2006.01)

(56) References Cited

U.S. PATENT DOCUMENTS

| | | | |
|---|---|---|---|
| 5,869,110 A | 2/1999 | Ogihara | |
| 6,450,795 B1 * | 9/2002 | Fields | B29C 49/70 |
| | | | 425/537 |
| 10,052,809 B2 | 8/2018 | Horigome et al. | |
| 2012/0189727 A1 | 7/2012 | Horigome et al. | |
| 2013/0149408 A1 | 6/2013 | Horigome et al. | |
| 2019/0022914 A1 | 1/2019 | Horigome et al. | |
| 2020/0406526 A1 | 12/2020 | Horigome et al. | |

FOREIGN PATENT DOCUMENTS

| | | |
|---|---|---|
| JP | 05038750 A | 2/1993 |
| JP | A-H05-285957 | 2/1993 |
| JP | 05116208 A | 5/1993 |
| JP | 06305002 A | 1/1994 |
| JP | 7069115 A | 3/1995 |
| JP | A-H07-266409 | 10/1995 |
| JP | 10276839 A | 10/1998 |
| JP | A-2000-015689 | 1/2000 |
| JP | A-2000-271995 | 10/2000 |
| JP | A-2001-275729 | 10/2001 |
| JP | 2003306219 A | 10/2003 |
| JP | A-2007-230160 | 9/2007 |
| WO | 2011030677 A1 | 3/2011 |

OTHER PUBLICATIONS

Chinese Patent Office Action dated Jun. 27, 2017 for Application No. 201610090365.7.

International Search Report, International Application No. PCT/JP2012/077275.

Official Action dated Oct. 9, 2018 for Japanese Patent Application No. 2017-166575 with translation, 6 pages total.

\* cited by examiner (A)

(B)

BLOW MOLDING MACHINE, MOLD COMPONENT MOUNTING METHOD AND MOLD UNIT

TECHNICAL FIELD

The present invention relates to a blow molding machine, a mold component mounting method and a mold unit.

BACKGROUND ART

For example, in a blow molding machine disclosed in patent document 1, many mold components are used. Since the mold components are made according to the sizes and shapes of containers to be blow molded, when the sizes and shapes of the container are changed according to a manufacturing lot, the mold components must be replaced.

When the same container is mass produced, the frequency of replacement of the mold components is low. However, recently, since the kinds of containers to be molded have increased and multi-kind small-quantity lots have increased, when the replacement frequency of the mold components increases, there is raised the need to reduce the burden of the mold component replacing operation.

CITATION LIST

Patent Document

Patent Document 1: JP-B2-H08-2586

DISCLOSURE OF THE INVENTION

Problems that the Invention is to Solve

The invention aims at reducing burden of an operation to carry mold components into and out from a blow molding machine.

The invention also aims at reducing burden of an operation to mount mold components onto a blow molding machine.

Means for Solving the Problems (1) One aspect of the invention is related to a blow molding machine to which a mold component can be mounted, the blow molding machine including:

a support member that supports the mold component carried into or out from the blow molding machine; and a moving mechanism that moves the support member to a projecting position at which the support member projects horizontally toward an outside of the blow molding machine and a storing position at which the support member is stored by the blow molding machine, wherein the blow molding machine includes a first fixed fulcrum shaft, wherein the support member includes a base end portion and a free end portion, the base end portion being rotatably supported by the first fixed fulcrum shaft, and the free end portion being provided with a first movable fulcrum shaft, and wherein the moving mechanism includes a plurality of links rotatably connected to each other, one of the plurality of links being rotatably supported by the first movable fulcrum shaft of the support member, and, when the support member is set at the projecting position, the plurality of links are maintained linearly by a first angle fixing tool, thereby enabling the plurality of links to serve as a leg portion that supports the free end portion of the support member.

According to the one aspect of the invention, the mold component can be carried into and out from the blow molding machine by using the support member and moving mechanism permanently provided to the blow molding machine. Also, since the linearly maintained plurality of links are used as the leg portion for supporting the free end portion of the support member protruded to the projecting position in the mold component carry-in/carry-out operation, a load resistant structure for the operation to carry in/out a mold component of fairly heavy weight can be realized. Especially, in the case of a multi-kind small-quantity lot, since mold components are replaced frequently, by using the support member and moving mechanism permanently provided to the blow molding machine, the burden of the operation to replace the mold components can be reduced greatly. Also, while the blow molding machine is actually working, by folding the plurality of links, the support member can be stored at the storing position, whereby the support member and moving mechanism provide no obstacle to the actual working of the blow molding machine.

(2) In the one aspect of the invention, the blow molding machine can include a second fixed fulcrum shaft at the lower side of the first fixed fulcrum shaft, the support member can include a second movable fulcrum shaft between the base end portion and the free end portion, and the moving mechanism can further include a support reinforcing member which is rotatably connected to the second fixed fulcrum shaft and the second movable fulcrum shaft respectively, a length of the support reinforcing member being extended and shortened in accordance with the movement of the support member, and the length of the support reinforcing member in an extended state thereof, when the support member is set at the projecting position, being maintained by fluid pressure. By providing at least one such support reinforcing member, the load resistant structure for the support member and moving mechanism can be strengthened further.

(3) In the one aspect of the invention, the first angle fixing tool can includes a first angle fixing plate, two fulcrum shafts provided to the first angle fixing tool and rotatably supporting the plurality of links respectively, two first pins, and two first insertion holes into which the two first pins are inserted when the support member is set at the projecting position, and the plurality of links to which the first angle fixing plate is attached can each include a first support hole that supports one of the two first pins inserted through one of the two first insertion holes.

Thus, since the two first pins are received into the first support holes through the first insertion holes of the first angle fixing plate, the plurality of links rotatable about the two fulcrum shafts of the first angle fixing plate can be maintained linearly. That is, the first angle fixing tool enables the plurality of links to serve as the leg portion. Also, by removing the two first pins, the plurality of links can be freely rotated and thus can be folded. In this manner, the support member can be moved to and stored at the storing position.

(4) In the one aspect of the invention, the first angle fixing plate can further include two second insertion holes into which the two first pins are inserted when the support member is set at the storing position.

In this case, by receiving the two first pins into the first support holes through the second insertion holes of the first angle fixing plate, the first angle fixing plate enables the plurality of links to be maintained in a folded state. This can realize the compact storage of the plurality of links at the storing position.

(5) In the one aspect of the invention, the blow molding machine can further include a second angle fixing tool that fixes the angle between the support member and one of the plurality of links when the support member is set at the storing position, the second angle fixing tool can include
  a second angle fixing plate fixed to the support member and on which the first movable fulcrum shaft is provided,
  a second pin, and
  a third insertion hole into which the second pin is inserted when the support member is set at the projecting position, and
  one of the plurality of links with the second angle fixing plate arranged thereon can include a second support hole that supports the second pin inserted through the third insertion hole.

Accordingly, by receiving the second pin into the second support hole through the third insertion hole of the second angle fixing plate, the support member and one link respectively freely rotatable with the first movable fulcrum shaft of the second angle fixing plate as its fulcrum can be maintained in a direction where the link hangs down with respect to the support member. Since the angle between the support member and link is fixed by the second angle fixing tool in this manner, the load resistant structure for the support member and moving mechanism can be strengthened further. Here, in the second angle fixing plate, there may also be formed a fourth insertion hole which functions similarly to the second insertion hole of the first angle fixing plate. In this case, also when the support member exists at the storing position, the angle between the support member and one link can be fixed.

(6) In the one aspect of the invention, the blow molding machine can include an injection molding station that injects a preform, and an injection device that injects resin to the injection molding station from a first direction, in a planar view, the support member can protrude laterally from the injection molding station in a second direction perpendicular to the first direction to be set at the projecting position, and the mold component can be an injection molding mold to be mounted onto the injection molding station. According to the one aspect of the invention, the burden of the operation to carry in and carry out an injection molding mold such as a hot runner mold and an injection cavity mold can be reduced.

(7) In the one aspect of the invention, the molding machine can include a blow molding station that blow molds a container from a preform, the mold component can include a pair of blow cavity split molds to be mounted onto the blow molding station and to be opened and closed along the first direction, and, in a planar view, the support member can protrude laterally from the blow molding station in a second direction perpendicular to the first direction to be set at the projecting position. According to the one aspect of the invention, the burden of the operation to carry in and carry out a blow molding mold such as a pair of blow cavity split molds can be reduced.

(8) Another aspect of the invention relates to a blow molding machine to which a mold component can be mounted, the blow molding machine including:
  a support member that supports the mold component carried into or out from the blow molding machine; and
  a moving mechanism that moves the support member to a projecting position at which the support member projects horizontally toward an outside of the blow molding machine and a storing position at which the support member is stored by the blow molding machine,
  wherein the blow molding machine includes a fixed fulcrum shaft,
  wherein the support member includes a movable fulcrum shaft movable together with the support member,
  wherein the moving mechanism includes a link that is rotatably supported by the fixed fulcrum shaft and the movable fulcrum shaft respectively, and
  wherein, when the support member is set at the projecting position, the link is set vertically with respect to the fixed fulcrum shaft by a first angle fixing tool and the support member is set horizontally with respect to the movable fulcrum shaft by a second angle fixing tool.

According to the other aspect of the invention, the burden of the operation to carry in and carry out a mold component of relatively light weight can be reduced.

(9) In the other aspect of the invention, the mold component may be supported by an elevation portion which can be lifted and lowered, a plurality of fixing attachments may be respectively fixed by a plurality of bolts to the elevation portion, and the mold component can be fixed by loosening the plurality of bolts so as to rotate the plurality of fixing attachments about the plurality of bolts, and fastening the plurality of bolts to the plurality of fixing attachments in a state where the plurality of fixing attachments are disposed at positions facing the elevation portion and the mold component is held between the elevation portion and the plurality of fixing attachments. The burden of the operation to carry in and carry out a mold component to be supported by the elevation portion can be reduced.

(10) A further other aspect of the invention relates to a blow molding machine including:
  a mold component;
  a fixing portion to which the mold component is fixed;
  a plurality of bolts supported by the fixing portion; and
  a plurality of fixing attachments rotatable about the plurality of bolts,
  wherein the mold component is fixed by loosening the plurality of bolts so as to rotate the plurality of fixing attachments about the plurality of bolts, and fastening the plurality of bolts to the plurality of fixing attachments in a state where the plurality of fixing attachments are disposed at positions facing the fixing portion and the mold component held between the fixing portion and the plurality of fixing attachments.

Accordingly, since the fixing attachment can be provided permanently in the fixing portion, the burden of the mounting/removing operation can be reduced, and further, can also contribute toward preventing the loss of the fixing attachment and bolt.

(11) A further other aspect of the invention relates to a blow molding machine including:
  a lower base;
  an upper base facing the lower base;
  a transfer plate supported by the upper base;
  two first rails supported by the upper base;
  a lip plate carried in along the two first rails;
  two second rails fixed to the transfer plate on an extension line of the two first rails; and
  a lip plate fixing attachment inserted into a hole formed in the transfer plate to fix the lip plate supported by the two second rails.

According to the further other aspect of the invention, the lip plate can be slid onto the second rail through the first rail, and can be mounted only by the lip plate fixing attachment.

(12) A further other aspect of the invention relates to a method for mounting a mold component, the method including:

a step of carrying a mold unit into a blow molding machine, the mold unit configured by a dummy lip plate and an upper mold component respectively loaded on a lower mold component;

a step of fixing the lower mold component of the mold unit to a lower fixing portion of the blow molding machine;

a step of lowering an upper elevation portion disposed above an upper base of the blow molding machine to set the upper elevation portion to a mold clamping position at a lower side of a transfer plate through a hole formed in the transfer plate, before a lip mold is mounted onto the transfer plate supported by the upper base of the blow molding machine;

a step of fixing the upper mold component to the upper elevation portion set at the mold clamping position;

a step of lifting the upper elevation portion to separate the upper mold component from the mold unit; and a step of removing the dummy lip plate thereafter.

According to the further other aspect of the invention, the upper mold component and lower mold component can be carried in integrally as a unit, the upper mold component and the upper elevation portion for supporting the same can be set and mounted at the mold clamping position, and especially, the burden of the operation to mount the upper mold component can be reduced.

(13) In the further other aspect of the invention, the lower mold component can be a hot runner mold and an injection cavity mold, the upper mold component can be an injection core mold, the lower fixing portion can be a lower base of the blow molding machine, and the hot runner mold of the lower mold component is fixed to the lower base, and the upper elevation portion can be an injection core mold fixing portion fixed to a mold clamping plate disposed above the upper base of the blow molding machine to be lifted and lowered, and the injection core mold can be fixed to the injection core mold fixing portion. In this case, especially, the burden of the operation to mount the injection core mold can be reduced.

(14) In the further other aspect of the invention, the lower mold component can be a temperature regulating pot, the upper mold component can be a temperature regulating core, the lower fixing portion can be a lower elevation portion that is lifted and lowered by a lower elevation drive portion fixed to a lower base side of the blow molding machine, and the upper elevation portion can be lifted and lowered by an upper elevation drive portion fixed to the upper base side of the blow molding machine. Thus, especially, the burden of the operation to mount the temperature regulating core can be reduced.

(15) A further other aspect of the invention relates to a mold unit including:

a lower mold component;

a dummy lip plate loaded on the lower mold component; and an upper mold component loaded on the dummy lip plate, wherein the dummy lip plate sets a gap, at the time of mold clamping, between the lower mold component and the upper mold component, which are mounted onto the blow molding machine and mold clamped.

According to the further other aspect of the invention, the upper mold component and lower mold component can be handled as a unit when they are carried in and carried out.

Effects of the Invention

According to the invention, the burden of the operation to carry a mold component into or out from a blow molding machine can be reduced.

MODE FOR CARRYING OUT THE INVENTION

Hereinafter, preferred embodiments of the invention will be specifically described with reference to a comparison example. Here, the embodiments described hereinafter do not limit unreasonably the contents of the invention disclosed in the appended claims and all of structures to be described in the embodiments are not always the essential structures as the solving means of the invention.

1. Blow Molding Machine

A blow molding machine according to the embodiments of the invention will be described with reference to the same drive system as in a 4-station blow molding machine of a rotation transfer type disclosed in, for example, the patent document 1, as an example. However, the invention is not limited thereto except for some of the embodiments. The blow molding machine of the patent document 1 is a blow molding machine of a 1 stage system or a hot parison system in which a preform (parison) is injected in an injection molding station and the preform is carried into the blow molding station by a lip mold used in injection molding to thereby bow mold a container. The blow molding machine of a 1 stage system is capable of installing a temperature regulating station between the injection molding station and blow molding station and a removal station downstream of the blow molding station. An embodiment excluding the injection molding station, temperature regulating station or removal station can be applied to a blow molding machine of a two stage system or a cold parison system in which a previously injection molded preform is heated and the preform is blow molded in a blow molding station. Also, as for the transfer system of a molded product, the invention can be applied to a blow molding machine which transfers the molded product by using not a rotation transfer system but a linear transfer system.

The present embodiment relates to a structure and a method for mounting a mold component onto a blow molding machine or removing the mold component from the blow molding machine, while description is given to only the structure of the blow molding machine that is necessary for replacement of the mold component. Also, the term "mold component" means a molding component that is replaced according to the size or the like of a container to be blow molded. Specifically, the mold component means one of various molds including an injection core mold, an injection cavity mold, a hot runner mold, a temperature regulating pot, a temperature regulating core, a blow core mold, a blow mold, a stretch rod, an eject pin, a lip mold (lip plate) and a neck mold, or a metal mold unit constituted of two or more of these superimposed on top of each other. Further, in some cases, the mold component may include a component which fixes or supports a mold, or serves as a spacer member.

Figure 1:
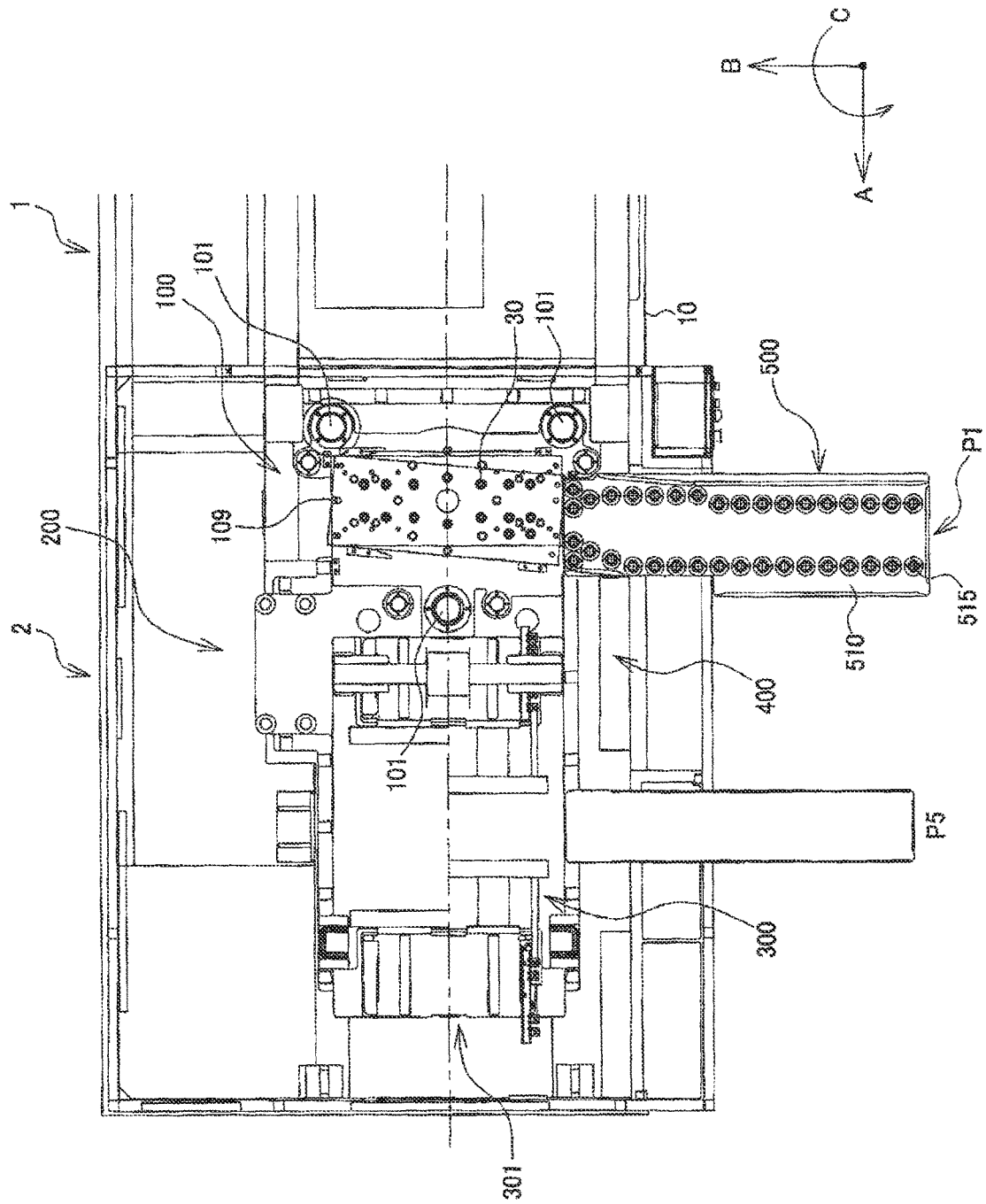
FIG. 1 is a planar view of a blow molding machine according to an embodiment of the invention, with its upper base removed.

FIG. 1 shows a blow molding machine of a rotation transfer type and, specifically, it is a planar view with an upper base removed. In FIG. 1, on a machine base 10, there exist a first area 1 for carrying an injection device (not shown) thereon and a second area 2 for molding a molding product after it is rotation transferred thereto. As shown in FIG. 1, two orthogonal-axis directions in the planar view are called a first direction A and a second direction B, respectively. A rotation direction around a vertical axis orthogonal to the two orthogonal-axis directions A, B is called C. In the second area 2, there are arranged, at 90-degree intervals along the rotation direction C, an injection molding station 100, a temperature regulating station 200, a blow molding station 300 and a removal station 400. An injection device arranged in the first area 1 injects resin toward the injection molding station 100 in the first direction A. A mold clamping/opening direction in the injection molding station 100 is, for example, a vertical direction where a mold clamping plate 102 (see FIG. 3) to be lifted and lowered together with three movable tie bars 101 moves. In the blow molding station 300, the opening/closing direction of a mold clamping/opening device 301 also coincides with the first direction A.

Figure 2:
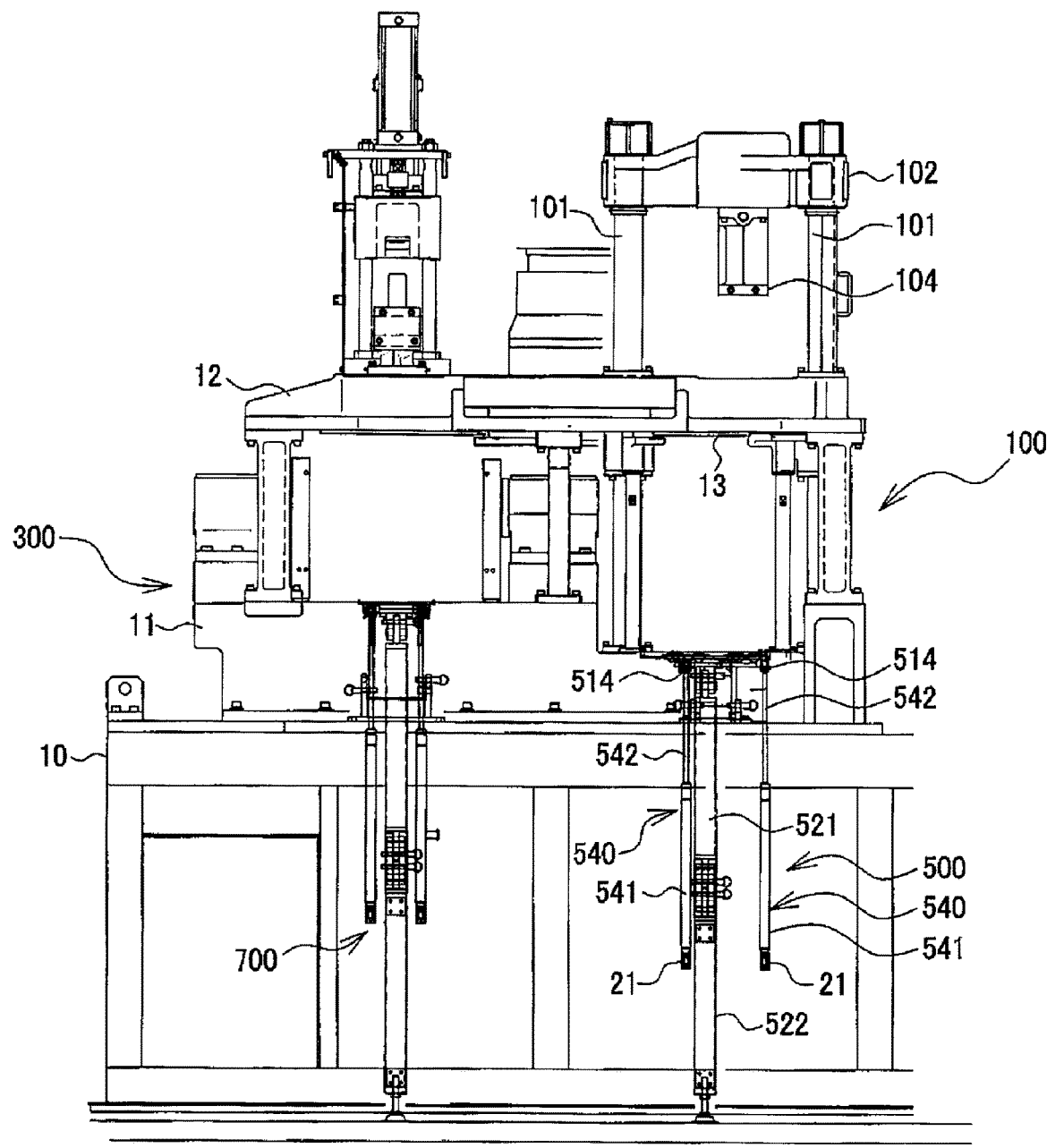
FIG. 2 is a front view of the injection molding station and blow molding station of the blow molding machine shown in FIG. 1.

2. Injection Molding Station
2.1. First Injection Mold Carry-In/Carry-Out Device Firstly, description is given to the replacement of a mold component in the injection molding station 100 with reference to FIGS. 2 to 4. As shown in FIG. 2, the machine base 10 includes a lower base 11 thereon. In the injection molding station 100 shown in FIG. 4, a hot runner mold 111 is fixed to the top surface of the lower base 11, while an injection cavity mold 112 is fixed to the top surface of the hot runner mold 111. Thus, a mold component to be mounted on the lower base 11 side is the hot runner mold 111 and injection cavity mold 112 having an injection cavity 112A. In this embodiment, as shown in FIG. 4, on the injection cavity mold 112, there is further put an injection core mold 113 having an injection core 113A through a dummy lip plate 114 and, in the mold replacement, an injection mold unit 110 shown in FIG. 4 can be handled integrally. Description of the injection mold unit 110 will be given later.

Figure 3:
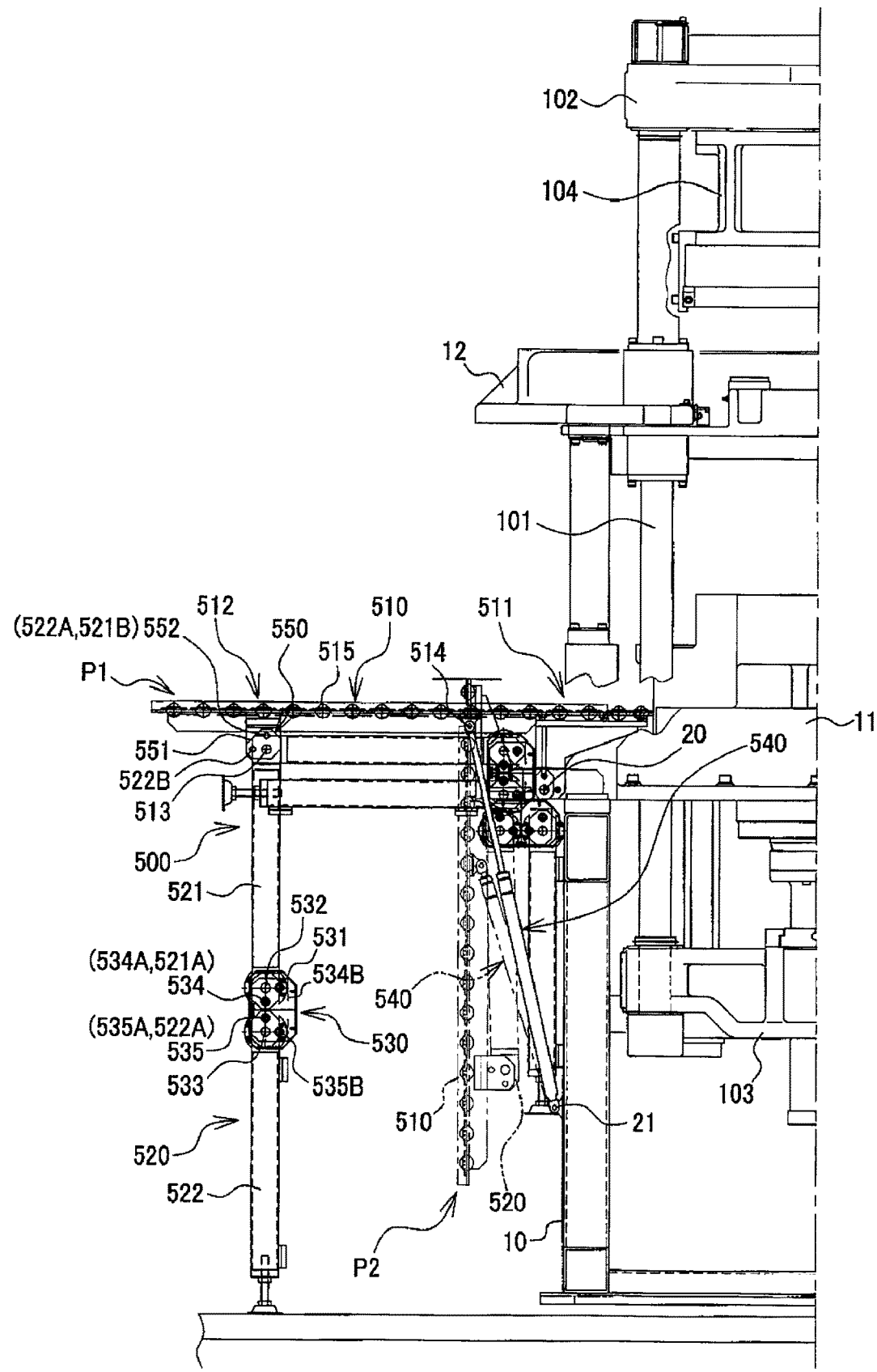
FIG. 3 is a side view of the machine, showing a state where the support member of a first injection mold carry-in/carry-out device is set at a projecting position and at a storing position.
Figure 4:
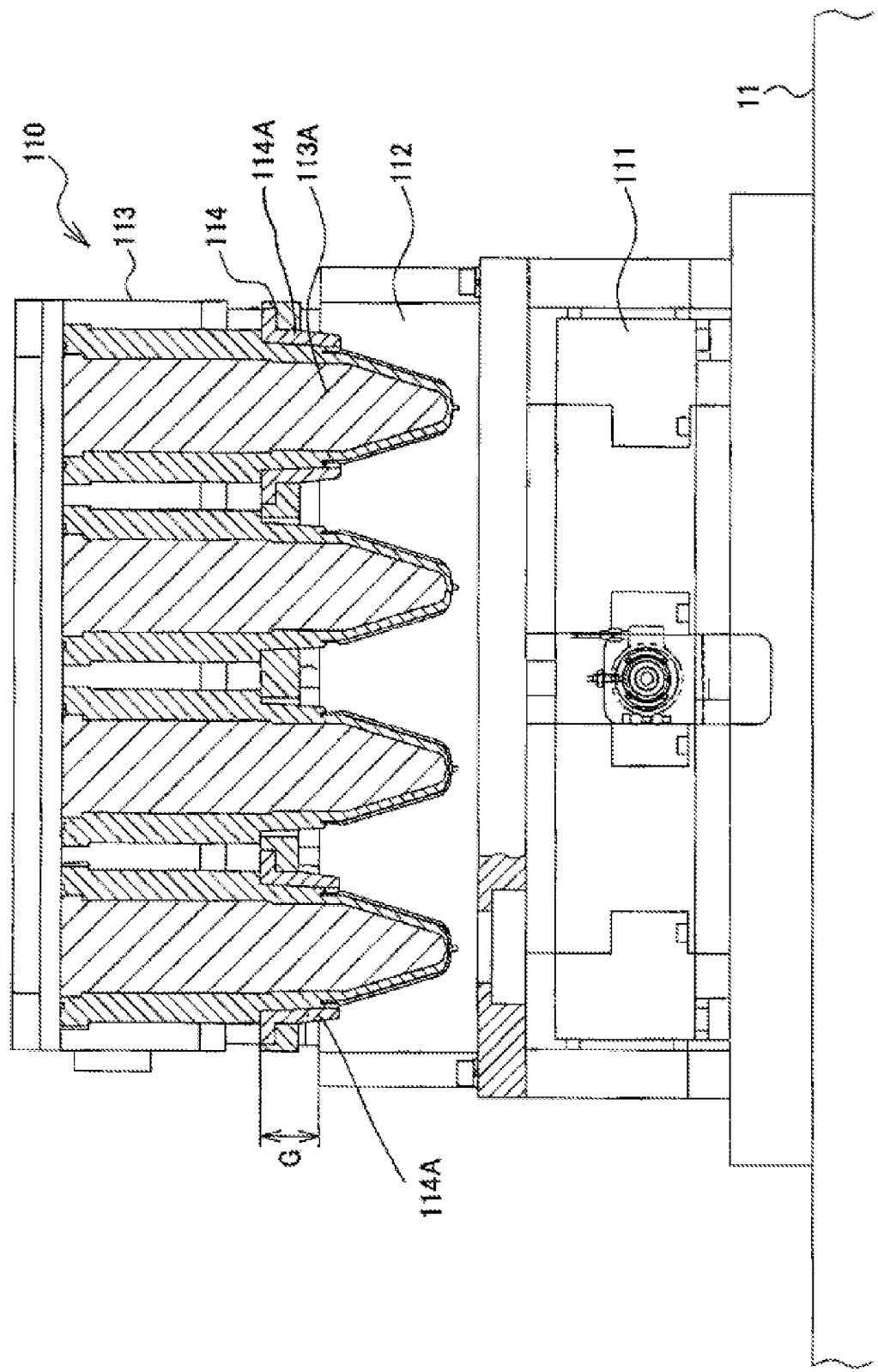
FIG. 4 is a front view of an injection mold unit.

In order to carry in and out the injection mold unit 110, a first injection mold carry-in/carry-out device 500 shown in FIGS. 1 to 3 is permanently provided to the blow molding machine. The first injection mold carry-in/carry-out device 500 includes a support member 510 for supporting the injection mold unit 110 and a moving mechanism 520 for moving the support member 510. The moving mechanism 520, as shown in FIGS. 1 and 3, moves the support member 510 to a projecting position P1 at which the support member 510 projects horizontally toward the outside of the blow molding machine and a storing position P2 at which the support member 510 is stored in the blow molding machine. At the storing position P2, for example, the support member 510 can be stored in a vertical state where it extends parallel to the side surface of the machine base 10.

The blow molding machine has a first fixed fulcrum shaft 20. The support member 510 includes a base end portion 511 and a free end portion 512, while the base end portion 511 is rotatably supported by the first fulcrum shaft 20 and the free end portion 512 is provided with a first movable fulcrum shaft 513.

The moving mechanism 520 includes a plurality of links 521, 522 rotatably connected to each other, while one 521 of the plurality of links 521, 522 is rotatably supported by the movable fulcrum shaft 513. In this moving mechanism 520, when the support member 510 is set at the projecting position P1, the plurality of links 521, 522 are held linearly by a first angle fixing tool 530, whereby the plurality of links 521, 522 serve as a leg portion that supports the free end portion 512 of the support member 510.

In this embodiment, while the hot runner mold 111 and injection cavity mold 112 are handled as an integral body, or the injection mold unit 110 is handled as an integral body, a mold component can be carried into or out from the blow molding machine by using the first injection mold carry-in/carry-out device 500 permanently provided to the blow molding machine. Further, when the mold component is carried in/out, since the linearly maintained plurality of links 521, 522 are used as the leg portion for supporting the free end portion of the support member 510 projected to the projecting position P1, there can be realized a load resistant structure for the operation to carry in/out a mold component of a fairly heavy weight. Especially, in the case of a multi-kind small-quantity lot, since mold components are replaced frequently, by using the first injection mold carry-in/carry-out device 500 permanently provided to the blow molding machine, the burden of the operation to replace the mold components can be reduced greatly. Also, while the blow molding machine is in actual operation, by folding the plurality of links 521, 522, the support member 510 can be stored at the storing position P2, whereby the first injection mold carry-in/carry-out device 500 is free from interference with the actual operation of the machine.

Here, as shown in FIGS. 1 and 3, on the surface of the support member 510, a plurality of spheres 515 partially projecting from the surface can be rotatably supported. Also, on the surface of the lower base 11 where the injection molding station 100 is arranged, spheres 30 partially projecting from the surface can be rotatably supported. In this case, since the mold component rolls in contact with the spheres 30, 515 to thereby reduce its friction force, the carry in/out operation can be performed with reduced load. Here, the spheres 30 projecting from the lower base 11 are projectingly energized by an energizing member such as a spring and, by clamping the hot runner mold 111 to the lower base 11, the spheres 30 become flush with the surface of the lower base 11.

In this embodiment, by providing a support reinforcing member (for example, an air damper) 540 shown in FIGS. 2 and 3, the position change of the support member 510 in the first injection mold carry-in/carry-out device 500 can be attained easily. For this purpose, the blow molding machine includes a second fixed fulcrum shaft 21 at the lowers side of the first fixed fulcrum shaft 20. Also, the support member 510 includes a second movable fulcrum shaft 514 between the base end portion 511 and free end portion 512.

The support reinforcing member 540 is rotatably connected to the second fixed fulcrum shaft 21 and second movable fulcrum shaft 514 and, in accordance with the movement of the support member 510, extends and shortens its length, whereby it maintains, by a hydraulic pressure, its extended length when the support member 510 is set at the projecting position P1. The support reinforcing member 540 can include, for example, a cylinder 541 with fluid sealed therein and a piston rod 542 removably insertable into the cylinder 541.

In FIG. 2, there are provided two support reinforcing members 540. However, by providing at least one support reinforcing member 540, the load resistant structure of the first injection mold carry-in/carry-out device 500 can be further strengthened.

The first angle fixing tool 530, as shown in FIG. 3, includes a first angle fixing plate 531, two fulcrum shafts 532, 533 provided on the first angle fixing plate 531 respectively for supporting the plurality of links 521, 522 rotatably, first pins 534, 535, and two first insertion holes 534A, 535A into which, when the support member 510 is set at the projecting position P1, the two first pins 534, 535 can be inserted. On the other hand, the plurality of links 521, 522, on which the first angle fixing plate 531 is disposed, respectively include a first support hole 521A (522A) for supporting one of the two first pins 534 (535) inserted through the first insertion holes 534A (535A).

Thus, the plurality of links 521, 522 rotatable with the two fulcrum shafts 532, 533 of the first angle fixing plate 531 as their fulcrums, as shown in FIG. 3, can be maintained linearly, for example, in the vertical direction when the two first pins 534, 535 are received into the first support holes 521A, 522A through the first insertion holes 534A, 535A of the first angle fixing plate 531. At this time, the two fulcrum shafts 532, 533 and the two first pins 534, 535 inserted into the first insertion holes 534A, 535A are also arranged linearly in the vertical direction. Therefore, the first angle fixing tool 530 enables the plurality of links 521, 522 to serve as the leg portion. Also, by removing the two first pins 534, 535, the plurality of links 521, 522 can be freely rotated and thus folded. In this manner, the support member 510 can be moved to the storing position P2 and stored there.

The first angle fixing plate 531, as shown in FIG. 3, can further include two second insertion holes 534B. 535B into which, when the support member is set at the storing position P2, the two first pins 534, 535 can be inserted. In this case, when the two first pins 534, 535 are received into the second support holes 521A, 522A through the second insertion holes 534B, 535B of the first angle fixing plate 531, the plurality of links 521, 522, as shown in FIG. 3, are bent by the first angle fixing plate 531 and are maintained parallel. At this time, the two fulcrum shafts 532, 533 and the two first pins 534, 535 inserted into the second insertion holes 534B, 535B are arranged linearly in the horizontal direction. Thus, the plurality of links 521, 522 can be stored compactly at the storing position P2.

In this embodiment, as shown in FIG. 3, there can be further included a second angle fixing tool 550 which, when the support member 510 is set at the projecting position P1, fixes the angles of the support member 510 and one link 521 of the plurality of links 521, 522. The second angle fixing tool 550 can include a second angle fixing plate 551, which is fixed to the support member 510 and to which a first movable fulcrum shaft 513 is provided, a second pin 552, and a third insertion hole 552A into which, when the support member 510 is set at the projecting position P1, the second pin 552 is inserted. On the other hand, the link 521, to which the second angle fixing plate 551 is disposed, can have a second support hole 521B for supporting the second pin 552 inserted through the third insertion hole 552A.

Thus, when the second pin 552 is received into the second support hole 521B through the third insertion hole 552A of the second angle fixing plate 551, the support member 510 and link 521, which are freely rotatable with the first movable fulcrum shaft 513 of the second angle fixing plate 551 as a fulcrum, are maintained in a direction where, as shown in FIG. 3, the link 521 hangs down with respect to the horizontally extending support member 510. At this time, the first movable fulcrum shaft 513 and second pin 552 inserted into the third insertion hole 552A are arranged linearly in the vertical direction. Thus, by fixing the angle between the support member 510 and link 521 by the second fixing tool 550, the load resistant structure of the first injection mold carry-in/carry-out device 500 can be further strengthened.

Here, in this embodiment, the second angle fixing plate 551 can have a fourth insertion hole 552B functioning similarly to the second insertion holes 534B, 535B formed in the first angle fixing plate 531. In this case, also when the support member 510 exists at the storing position P2, the angles of the support member 510 and link 521 can be fixed.

2.2. Injection Unit Integrally Mounting/Removing Method

Figure 5:
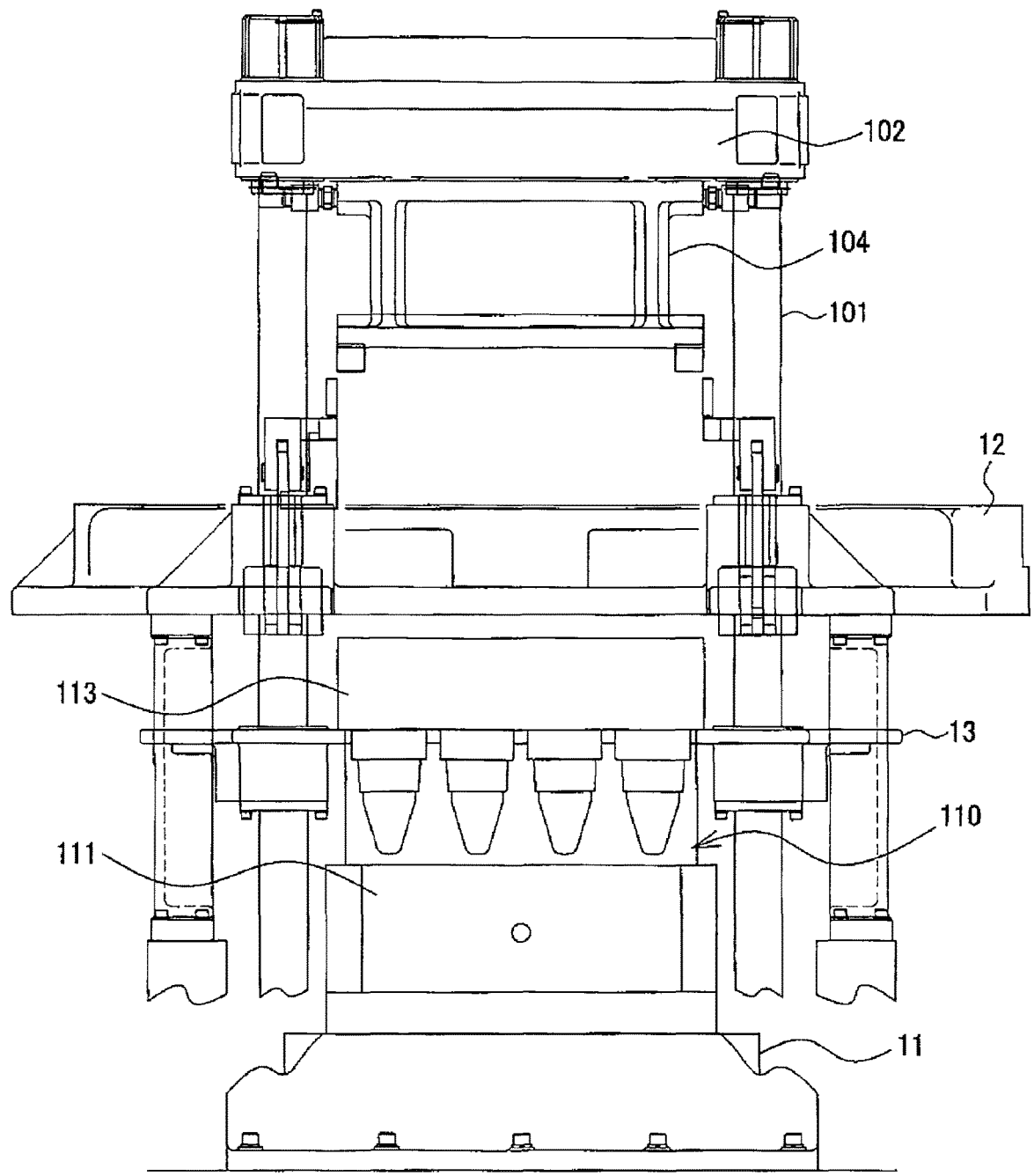
FIG. 5 is an explanatory view of a method for mounting onto a mold clamping plate an injection core mold which is carried in by the first injection mold carry-in/carry-out device and is set at a mold clamping position.

Next, description is given to a method for mounting an injection mold onto the blow molding machine using the first injection mold carry-in/carry-out device 500 with reference to FIGS. 4 and 5. Before that, the clamping drive of the injection mold is explained with reference to FIG. 3. At the lower side of the machine base 10 shown in FIG. 3, there is provided a traction plate 103 and, as the traction plate 103 is lifted and lowered, a mold clamping plate 102 connected to the traction plate 103 by three movable tie bars 101 is lifted and lowered. An injection core mold fixing portion 104 is fixed to the mold clamping plate 102. Here, the mold clamping plate 102 and injection core mold fixing portion 104 capable of lifting and lowering the injection core mold 113 are also called an elevation portion.

The hot runner mold 111 shown in FIG. 4 is fixed to the lower base 11, while the injection cavity mold 112 is fixed to the top surface of the hot runner mold 111. On the other hand, the injection core mold 113 is fixed to the injection core mold fixing portion 104 supported by the mold clamping plate 102. Also, as shown in FIG. 2, on the upper base 12, there is rotatably supported a transfer plate 13 which can be driven to rotate. The transfer plate 13, as shown in FIG.

1 of the patent document 1, includes four transfer plates arranged at 90-degree intervals in the planar view, and one of the four transfer plates 13 is stopped in the injection molding station 100. In each of the four transfer plates 13, there is arranged a lip mold (not shown) to be supported by a mounting hole 15 formed in an openable/closable lip plate 14. The transfer plate 13 further includes a hole 16 to be described later.

Referring to the mold clamping operation in the injection molding station 100, when the transfer plate 13 and mold clamping plate 102 are lowered to close the injection core mold 113 to the lip mold and further the mold clamping plate 102 is lowered, the lip mold is pressed by the injection core mold 113 and is lowered together with the transfer plate 13 and lip plate 14, whereby the injection core mold 113 and lip mold are clamped to the injection cavity mold 112. Here, the transfer plate 13 in this embodiment includes, for example, such an elevation mechanism as disclosed in the patent document 1 and can be driven to lift and lower independently of an injection core.

In order to carry a mold component into the injection molding station 100, there is prepared, for example, the injection mold unit 110 shown in FIG. 4. Here, the injection mold unit 110 is carried in a state where the lip mold and the lip plate 14 for supporting the same are not mounted on the transfer plate 13. A gap G between the injection cavity mold 112 and injection core mold 113 in the mold clamping time shown in FIG. 4 is originally set by the lip plate 14 and lip mold. Since the lip plate 14 and lip mold are not present at the mold carry-in time, the gap G is secured by using the dummy lip plate 114 shown in FIG. 4. In this embodiment, the gap G is set by the dummy lip plate 114 and two dummy lip molds 114A provided on its both ends in the longitudinal direction. However, the gap G may also be set only by the dummy lip plate 114. The intervention of the dummy lip plate 114 enables the injection core mold 113 to be set at the original mold clamping height from the lower base 11 when the hot runner mold 111 is mounted on the lower base 11. Here, a mold component existing at the upper side of the dummy lip plate 114 is called an upper mold component, whereas a mold component existing at the lower side of the dummy lip plate 114 is called a lower mold component.

The injection mold unit 110 is loaded on the support member 510 set at the projecting position P1 shown in FIGS. 1 and 3. When pushed, the injection mold unit 110 is moved in rolling contact with the spheres 514 on the support member 510 and spheres 30 on the lower base 11 and is positioned at a given position by a positioning pin 109 shown in FIG. 1. And, the hot runner mold 111 of the injection mold unit 110 is fixed to the lower base 11 of the blow molding machine (see FIG. 4). Thus, since the hot runner mold 111 is fixed to the lower base 11 and the injection cavity mold 112 is previously fixed on the hot runner mold 111, the mounting of the mold component onto the lower base 11 is completed.

Figure 6:
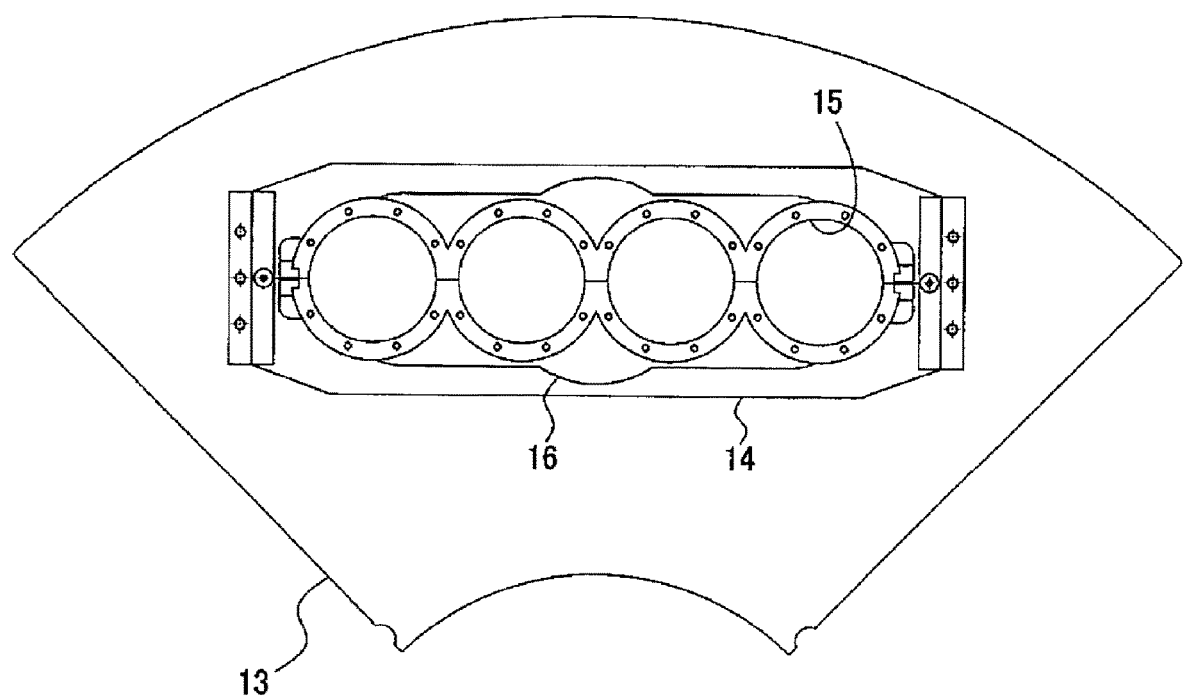
FIG. 6 is a planar view of a transfer plate.

Next, there is carried out a process for fixing the injection core mold 113 to the injection core mold fixing portion 104. Specifically, in a state before the lip plate 14 and lip mold are mounted on the transfer plate 13 supported by the upper base 12 of the blow molding machine or by the transfer plate elevation mechanism, the mold clamping plate 102 disposed above the upper base 12 of the blow molding machine is pulled and lowered by the traction plate 103. Since the lip plate 14 and lip mold are not mounted on the transfer plate 13, the hole 16 (see FIG. 6) capable of passing the injection core mold 113 therethrough is opened. Therefore, in the mold component mounting time, by lowering the transfer plate 13 earlier, the injection core mold 113 can be set at a mold clamping position existing at the upper side of the transfer plate 13 through the hole 16 of the transfer plate 13.

On the other hand, as described above, the injection core mold 113 of the injection mold unit 110 fixed to the lower base 11 is set at the mold clamping position due to the intervention of the dummy lip plate 114. FIG. 5 shows a state where the injection core mold 113 of the injection mold unit 110 is set at the mold clamping height. By lowering the injection core mold fixing portion 104 down to the mold clamping height position, the injection core mold 113 can be fixed to the injection core mold fixing portion 104.

Figure 7:
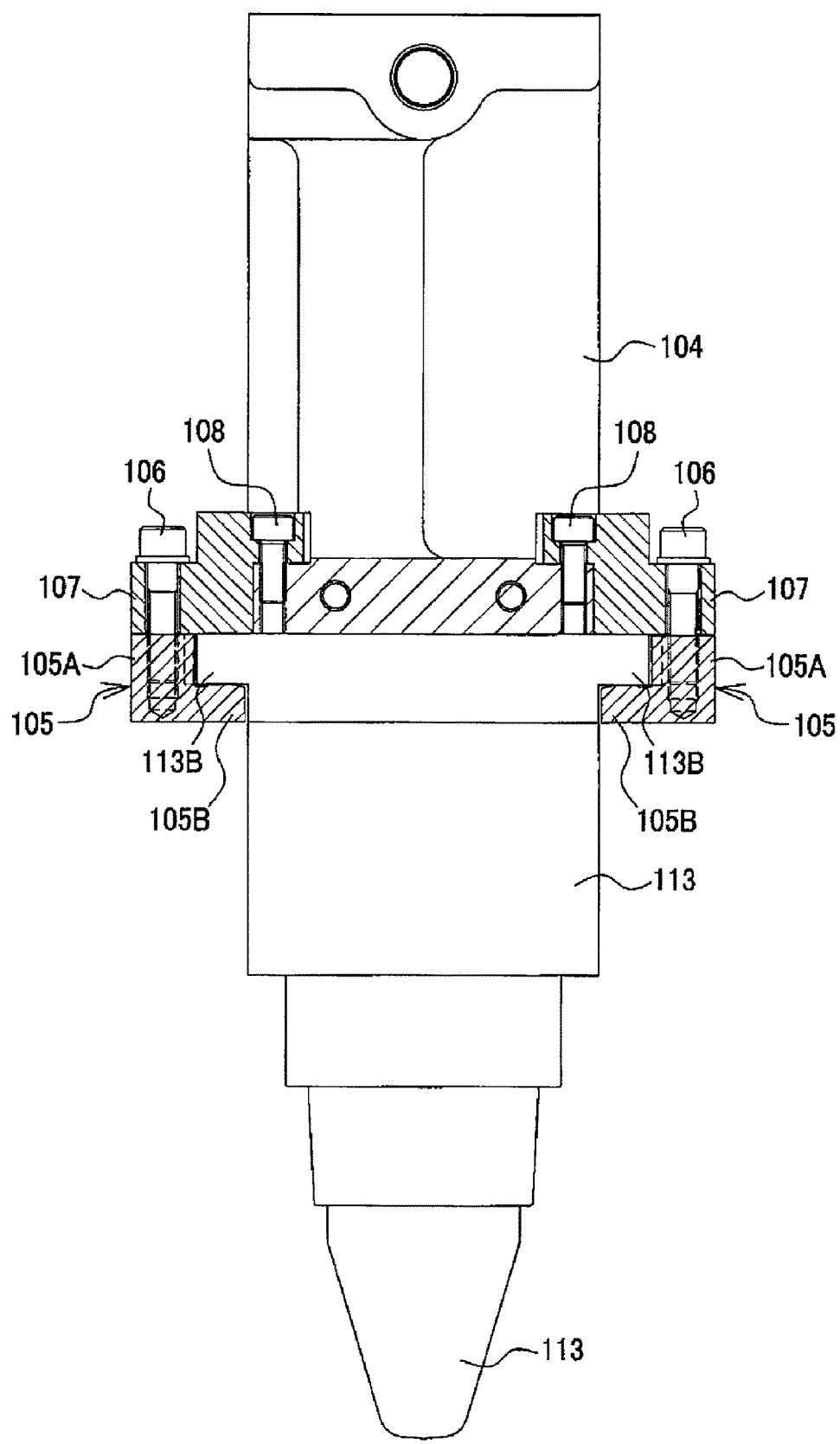
FIG. 7 is an explanatory view of a method for mounting the injection core mold by using a fixing attachment.

Here, as an example for fixing a mold component to a fixing portion, there is shown in FIG. 7 an example for fixing the injection core mold 113 to the injection core mold fixing portion 104. The injection core mold 113 serving as a mold component has two projections 113B provided on the upper ends thereof facing the injection core mold fixing portion 104 serving as a fixing portion and projecting in the width direction thereof. To the injection core mold fixing portion 104, there are fixed fixing attachments 105, for example, L-shaped attachments 105 each having a vertical portion 105A and a horizontal portion 105B, using bolts 106. Mounting attachments 107, each having a hole for insertion of the bolt 106 therethrough, can be fixed to the injection core mold fixing portion 104 by using a bolt 108. Here, the shape of the mounting attachment 107 may also be provided integrally with the injection core mold fixing portion 104.

Since the four (in FIG. 7, only two on one side are shown) horizontal portions 105B, 105B are arranged so as to face inward and to be opposed to each other, the two projections 113B of the injection core mold 113 are held between the L-shaped attachments 105 and mounting attachments 107 and are fastened by the bolts 106.

As described above, when lowering the injection core mold fixing portion 104 and setting it at the mold clamping position, the bolts 106 are be loosened, the four L-shaped attachments 105 are rotated about the bolts 106, and the four horizontal portions 105B are set to face outward. In this case, the injection core mold fixing portion 104 can be set at the mold clamping position without interfering with the two projections 113B of the injection core mold 113. After then, the four L-shaped attachments 105 are rotated about the bolts 106 to provide a state shown in FIG. 7, and the bolts 106 are then fastened. This can facilitate the mold component replacing operation.

The L-shaped attachments 105 need not be removed each time the mold component is replaced but the bolts 106 may only be loosened. Thus, the L-shaped attachments 10 can be permanently provided to the injection core mold fixing portion 104, thereby eliminating the fear of the loss of components.

Here, the fixing of the mold component using such L-shaped attachment can also be applied to other mold than the injection core mold 113. For example, it can also be used to the mounting of the hot runner mold 111 onto the lower base 11, the mounting of the injection cavity mold 112 onto the hot runner mold 111, etc., and further, can also be used to the mounting of various mold components to be described later. Also, for facilitation of the mold mounting and removing operation by the L-shaped attachment, the penetration hole for the bolt 106 may be formed in an elongated hole shape, whereby, after the bolt is loosened, the member can be moved horizontally.

After the injection core mold 113 is mounted on the injection core mold fixing portion 104, the mold clamping plate 102 is lifted and the injection core mold 113 is lifted by the injection core mold fixing portion 104. Thus, the injection core mold 113 can be separated from the injection mold unit 110. Finally, the dummy lip plate 114 is removed from the injection cavity mold 112. This completes the mold component mounting in the injection molding station 100. Here, by performing the above mounting process in reverse order, when removing the mold component from the injection molding station 100, it can be removed in the state of the injection mold unit 110 shown in FIG. 4.

2.3. Second Injection Mold Carry-In/Carry-Out Device and Mounting Method

Figure 8:
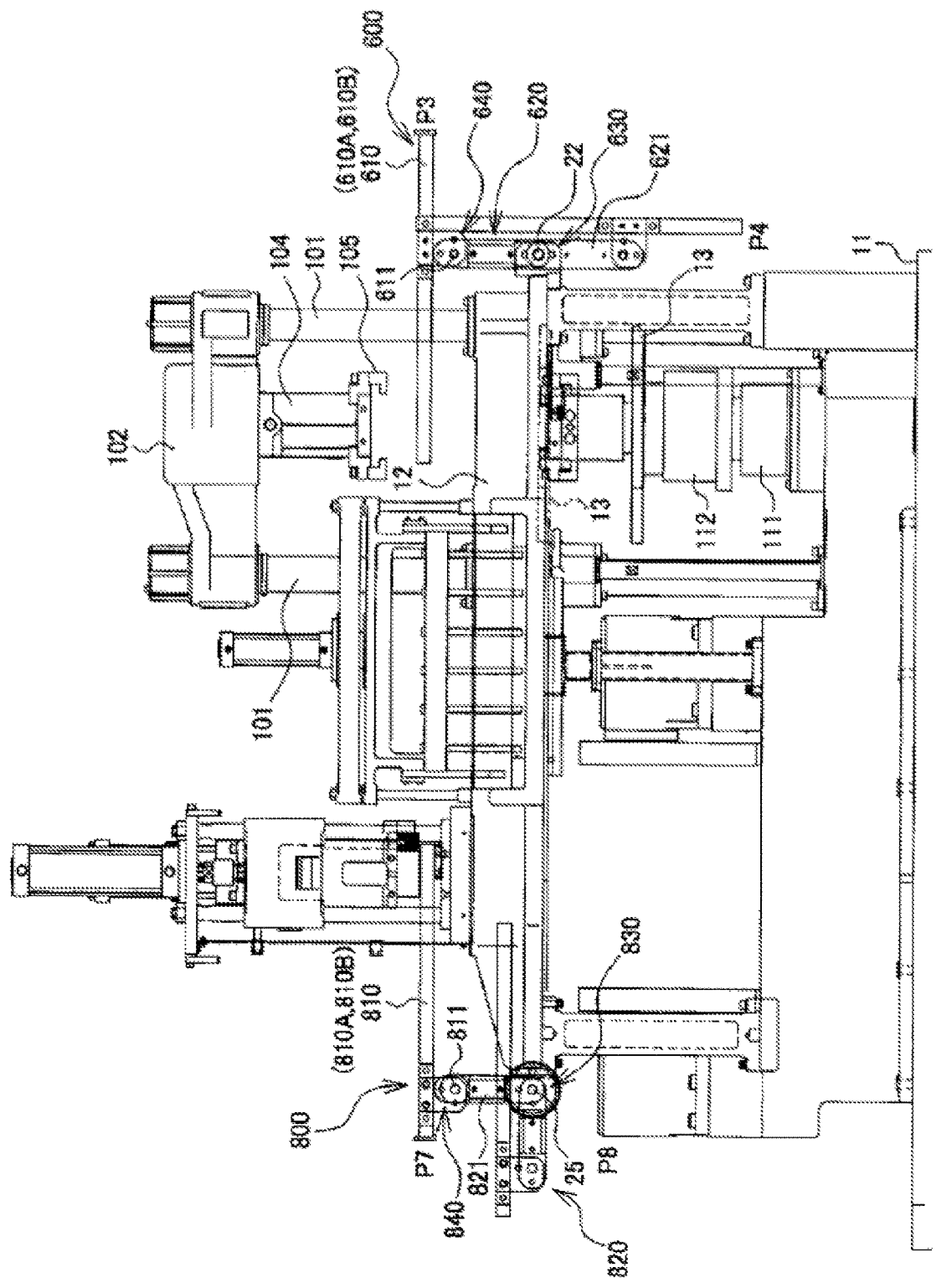
FIG. 8 is a view of a second injection mold carry-in/carry-out device and a second blow mold carry-in/carry-out device.

FIG. 8 shows a second injection mold carry-in/carry-out device 600 for carrying in/out the injection core mold 113. The second injection mold cony-in/carry-out device 600 includes a support member 610 that supports the injection core mold 113 serving as a mold component to be carried into and out from the blow molding machine, and a moving mechanism 620 that moves the support member 610 to a projecting position P3 at which the support member 610 projects horizontally toward the outside of the blow molding machine and a storing position P4 at which the support member is stored by the blow molding machine.

The blow molding machine has a fixed fulcrum shaft 22. The support member 610 has a movable fulcrum shaft 611 movable together with the support member 610. The moving mechanism 620 has a link 621 rotatably supported by the fixed fulcrum shaft 22 and movable fulcrum shaft 611. When the support member 610 is set at the projecting position P3, the link 621 is set vertically with respect to the fixed fulcrum shaft 22 by a first angle fixing tool 630, and the support member 610 is set horizontally with respect to the movable fulcrum shaft 611 by a second angle fixing tool 640. The first and second angle fixing tools 630 and 640 can be structured similarly to the first and second angle fixing tools 530 and 550 shown in FIG. 3, while the angles of the support member 610 and link 621 can be fixed by pins in such a manner that they can be maintained at the projecting position P3 or at the storing position P4. Here, at the storing position P4, the support member 610 and link 621 are both stored parallel in the vertical direction.

Figure 9:
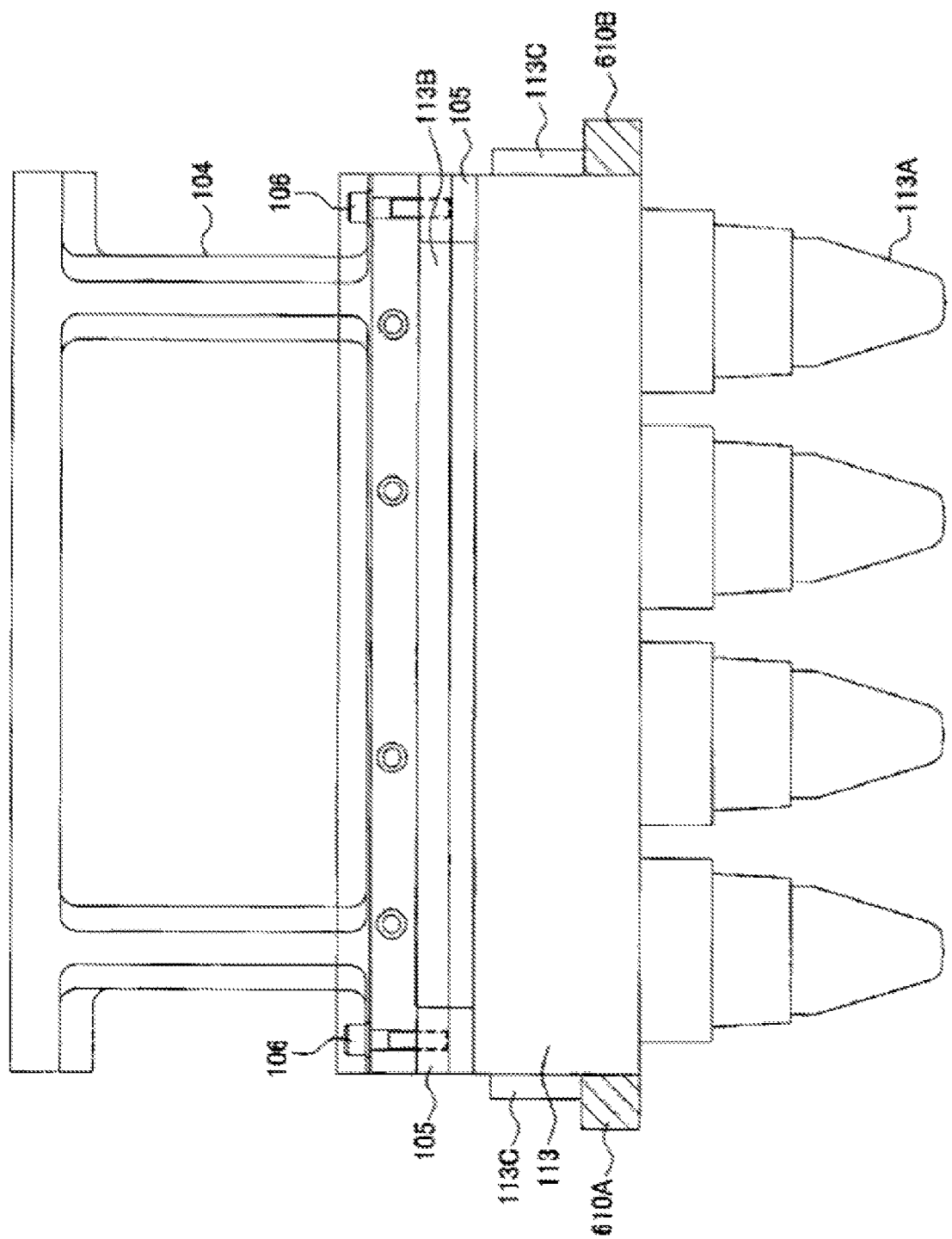
FIG. 9 is a view of an injection core mold to be carried by a second injection mold carry-in/carry-out device.

The support member 610, as shown in FIG. 9, can be constituted of two rails 610A and 610B. The injection core mold 113 serving as a mold component includes projections 113C, 113C to be carried on the rails 610A and 610B. By sliding the projections 113C, 113C on the rails 610A and 610B, the injection core mold 113 can be carried into the lower side of the injection core mold fixing portion 104. The injection core mold 113 carried into the lower side of the injection core mold fixing portion 104 is fixed in the same method as the method shown in FIG. 7. However, an L-shaped attachment 105 situated on the carry-in side of the injection core mold 113 in the injection core mold fixing portion 104 shown in FIG. 8 must be removed previously, because it interferes with the injection core mold 113 carried in. The removal of the injection core mold 113 can be performed in reverse order to the above-mentioned mounting process.

When the second injection mold carry-in/carry-out device 600 is used, the injection mold unit 110 shown in FIG. 4 is not used. The hot runner mold 111 and injection cavity mold 112 are integrally carried onto the lower base 11 of the blow molding machine using the second injection mold carry-in/carry-out device 600. After then, when the hot runner mold 111 is fixed to the lower base 11, the mounting of the mold component onto the lower base 11 is completed. The injection core mold 113 is mounted using the second injection mold carry-in/carry-out device 600.

3. Blow Molding Station 3.1. First Blow Mold Carry-In/Carry-Out Device

Figure 10:
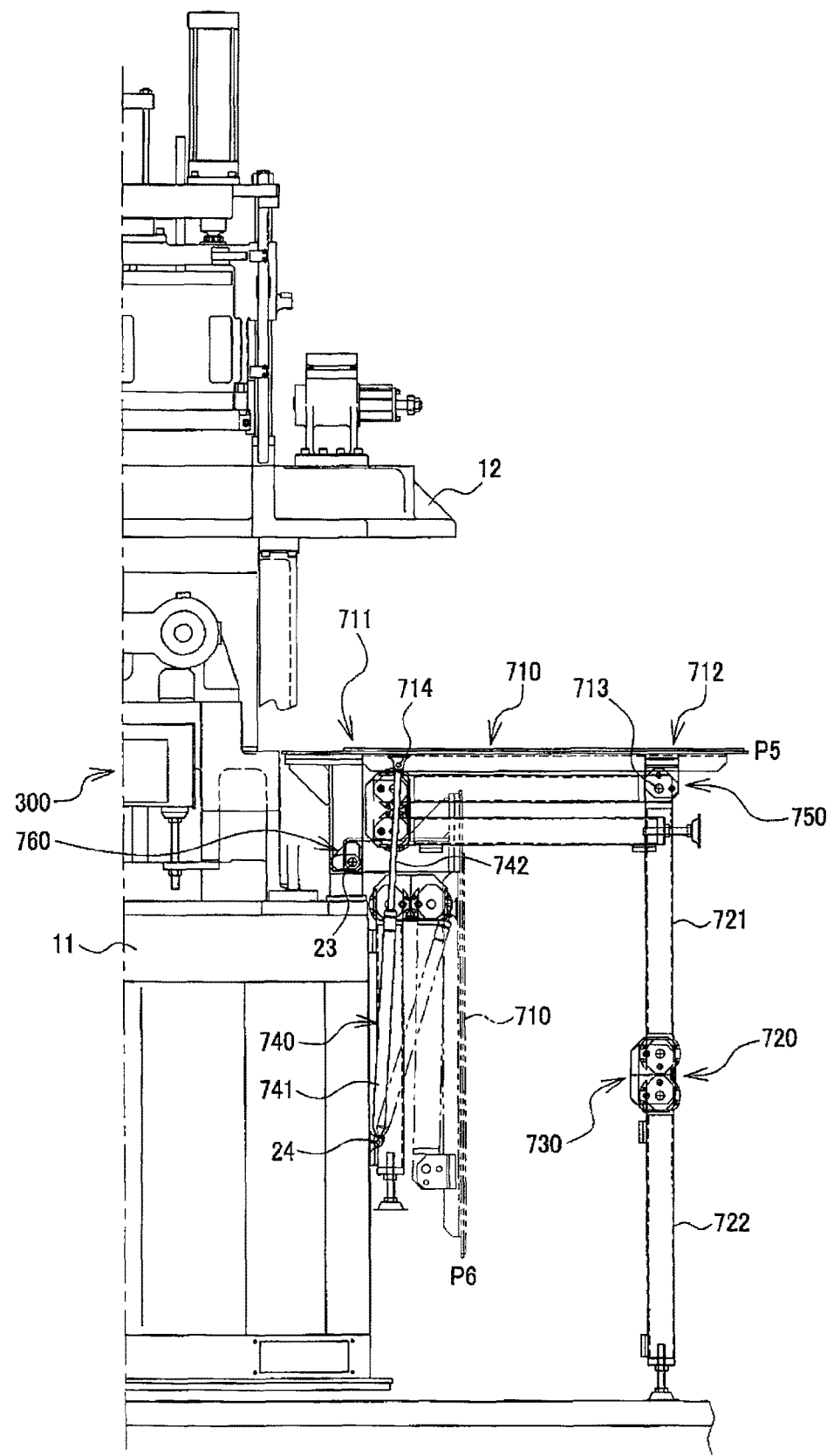
FIG. 10 is a view of first and second blow mold carry-in/carry-out devices.

Next, description is given of the first blow mold carry-in/carry-out device 700 with reference to FIGS. 1, 2 and 10. The first blow mold carry-in/carry-out device 700 is substantially the same in structure as the first injection mold carry-in/carry-out device 500 and includes a support member 710 and a moving mechanism 720. In this embodiment, the first blow mold carry-in/carry-out device 700 is different from first blow injection carry-in/carry-out device 500 in that the support member 710 does not include on its surface the spheres 515 provided on the surface of the support member 510. A blow mold (not shown) to be carried on the support member 710 includes at least a pair of blow cavity molds, a pair of pressure receiving plates and a pair of fixing plates for fixing them. Since the paired pressure receiving plates include on their lower surfaces slide attachments for reducing their friction with respect to the lower base 11, when carrying in and out the blow mold, the friction thereof on the support member can be reduced by the slide attachments. Or, instead of the slide attachment, a rolling member, for example, a roller may also be provided on the side surface of the blow mold.

The moving mechanism 720, as shown in FIGS. 1, 2 and 10, moves the support member 710 to a projecting position P5 at which the support member 710 projects horizontally toward the outside of the blow molding machine and a storing position P6 at which the support member 710 is stored by the blow molding machine. At the storing position P6, for example, the support member 710 can be stored in a vertical state so that it extends parallel to the side surface of the machine base 10.

The blow molding machine includes a first fixed fulcrum shaft 23. The support member 710 includes a base end portion 711 and a free end portion 712, while the base end portion 711 is rotatably supported by the first fixed fulcrum shaft 23 and the free end portion 712 includes a first movable fulcrum shaft 713.

The moving mechanism 720 includes a plurality of links 721, 722 rotatably connected to each other, while one link 721 of the plurality of links 721, 722 is rotatably supported by the movable fulcrum shaft 713 of the support member 710. In the moving mechanism 720, when the support member 710 is set at the projecting position P5, the plurality of links 721, 722 are maintained linearly by a first angle fixing tool 730, whereby the plurality of links 721, 722 serve as a leg portion for supporting the free end portion 712 of the support member 710.

In this embodiment, by providing a support reinforcing member (for example, an air damper) shown in FIGS. 2 and 10, the position change of the support member 710 in the first blow mold carry-in/carry-out device 700 can be facilitated. For this purpose, the blow molding machine includes a second fixed fulcrum shaft 24 at the lower side of the first fixed fulcrum shaft 23, while the support member 710 includes a second movable fulcrum shaft 714 between the base and free end portions 711 and 712.

The support reinforcing member 740 is rotatably connected to the second fixed fulcrum shaft 24 and second movable fulcrum shaft 714 and, with the movement of the support member 710, extends and shortens its length, whereby it maintains, by hydraulic pressure, its extended length when the support member 710 is set at the projecting position P1. The support reinforcing member 740 can include, for example, a cylinder 741 with fluid sealed therein and a piston rod 742 insertable into and removable from the cylinder 541.

In FIG. 2, there are provided two support reinforcing members 740. However, by providing at least one support reinforcing member 740, the position change of the support member 710 in the first blow mold carry-in/carry-out device 700 can be facilitated further.

There can be further included a second angle fixing tool 750 which, when the support member 710 is set at the projecting position P5, is used to fix the angles of the support member 710 and one link 721 of the plurality of links 721, 722. There can be further included a third angle fixing tool 760 which, when the support member 710 is set at the projecting position P5, is used to fix the angle of the support member 710 such that it is maintained in a horizontal state. Here, the above-mentioned first to third angle fixing tools 730, 750 and 760 can employ a structure which, similarly to the first and second angle fixing tools 530 and 550 of the first injection mold carry-in/carry-out device 500, can fix the set angles of the projecting position P5 and storing position P6 by inserting and removing a pin. Here, similarly to the third angle fixing tool 760 of the first blow mold carry-in/carry-out device 700, a third angle fixing tool can be added to the first injection mold carry-in/carry-out device 500 as well.

3.2. Second Blow Mold Carry-In/Carry-Out Device

Figure 11:
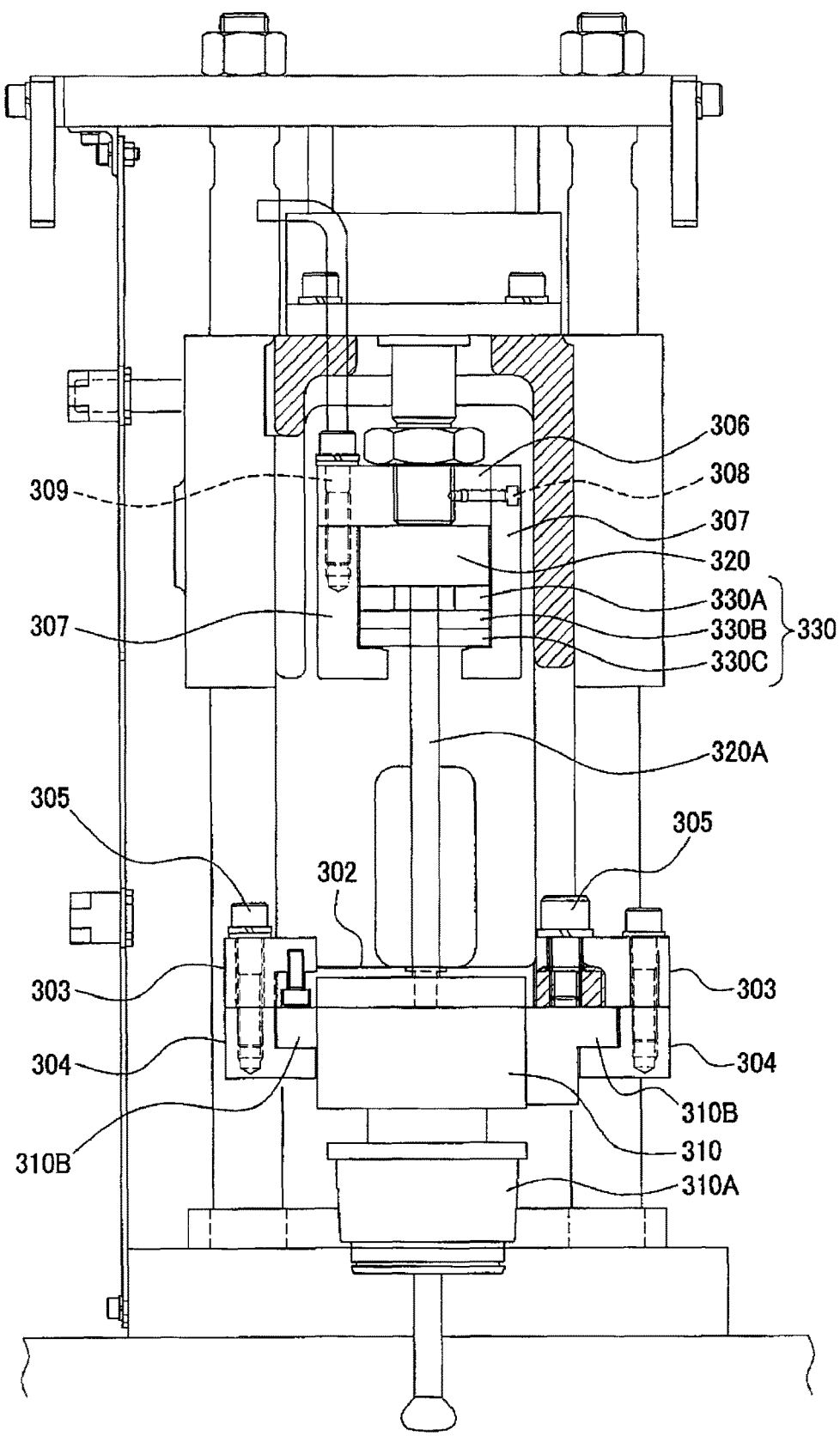
FIG. 11 shows a state where a blow core mold and a stretch rod fixing plate to be carried by the second blow mold carry-in/carry-out device are mounted.

FIG. 8 shows a second blow mold carry-in/carry-out device 800 which is used to carry in and out a blow core mold 310 including a blow core 310A and a stretch rod fixing plate 320 with a stretch rod 320A fixed thereto, respectively shown in FIG. 11. The second blow mold carry-in/carry-out device 800 includes a support member 810 that supports the blow core mold 310 serving as a mold component to be carried into and out from the blow molding machine, and a moving mechanism 820 that moves the support member 810 to a projecting position P7 at which the support member 810 projects horizontally toward the outside of the blow molding machine and a storing position P8 at which the support member 810 is stored by the blow molding machine.

The blow molding machine has a fixed fulcrum shaft 25. The support member 810 has a movable fulcrum shaft 811 movable together with the support member 810. The moving mechanism 820 has a link 821 rotatably supported by the fixed fulcrum shaft 25 and movable fulcrum shaft 811. When the support member 810 is set at the projecting position P7, the link 821 is set vertically with respect to the fixed fulcrum shaft 25 by a first angle fixing tool 830 and the support member 810 is set horizontally with respect to the movable fulcrum shaft 811 by a second angle fixing tool 840. The first and second angle fixing tools 830 and 840 can be structured similarly to the first and second angle fixing tools 530 and 550 shown in FIG. 3, while the angles of the support member 810 and link 821 can be fixed so that they can be maintained at the projecting position P7 or storing position P8 by a pin. Here, at the storing position P8, the support member 810 and link 821 are both stored parallel in the vertical direction or in the horizontal direction.

The support member 810 can be constituted of two rails 810A and 810B similar to the two rails 610A and 610B shown in FIG. 9. On the blow core mold 310 serving as a mold component, there are provided projections loaded on the rails 810A and 810B. By sliding the projections on the rails 810A and 810B the blow core mold 310 can be carried into the lower side of the blow core mold fixing portion 302 shown in FIG. 11. The blow core mold 310 carried into the lower side of the blow core mold fixing portion 302 is fixed by the same method as shown in FIG. 7. That is, while projections 310B provided on the blow core mold 310 are held between a mounting attachment 303 and a fixing attachment 304, for example, an L-shaped attachment 304, the blow core mold 310 is fastened by bolts 305. However, the L-shaped attachment 304 situated on the carry-in side of the blow core mold 310 in the blow core mold fixing portion 302 shown in FIG. 11 must be removed previously, because it interferes with the blow core mold 310 to be carried in. The blow core mold 310 can be removed in reverse order to the above-mentioned mounting process. Here, the mounting attachment 303 may also be formed integrally with the blow core mold fixing portion 302.

The stretch rod fixing plate 320 can be carried onto the blow core mold 310 with the stretch rod 320A inserted into the vertical hole of the blow core mold 310 and they can be carried in simultaneously by the second blow mold carry-in/carry-out device 800. In this case, between the stretch rod fixing plate 320 and blow core mold 310, as shown in FIG. 11, a plurality of, for example, three preliminary stretch adjusting plates 330 (330A, 330B, 330C) are interposed therebetween.

The stretch rod fixing plate 320 and preliminary stretch adjusting plates 330 are supported between a fixing portion 306 and fixing attachments 307, for example, an L-shaped attachment 307. One of the fixing attachments 307 is fixed to the fixing portion 306 by a bolt 308 and, after the stretch rod fixing plate 320 and preliminary stretch adjusting plates 330 are arranged, the other L-shaped attachment 307 is fixed to the fixing portion 306 by a bolt 309.

Here, the term "preliminary stretch" means that, in a stage where the blow core 310A of the blow core mold 310 is clamped to the lip mold and blow cavity split mold, before introduction of the blow air, the stretch rod 320A stretches a preform longitudinally. With the preliminary stretch, such section of the preform as exists just below its lip portion can be longitudinally stretched first, thereby being able to adjust the thickness distribution of a container to be blow molded.

As shown in FIG. 11, when the preliminary stretch adjusting plates 330 are disposed below the stretch rod fixing plate 320, a preliminary stretch stroke is zero. When at least one of the three preliminary stretch adjusting plates 330 is disposed above the stretch rod fixing plate 320, the position of the lower end of the stretch rod 320A is lowered, thereby enabling the execution of the preliminary stretch. By changing the combination of the three preliminary stretch adjusting plates 330A, 330B and 330C disposed above the stretch rod fixing plate 320, the preliminary stretch stroke can be changed. In the three preliminary stretch adjusting plates 330A, 330B and 330C, there can be previously formed slits which enable their associated plates to be inserted and removed without interfering with the stretch rod 320A. Here, the blow core mold fixing portion 302 and stretch rod fixing plate 320 are capable of lifting and lowering the blow core mold 310 and stretch rod 320A using a drive source such as an air cylinder, and thus they are an example of an elevating portion.

4. Temperature Regulating Station

Figure 12:
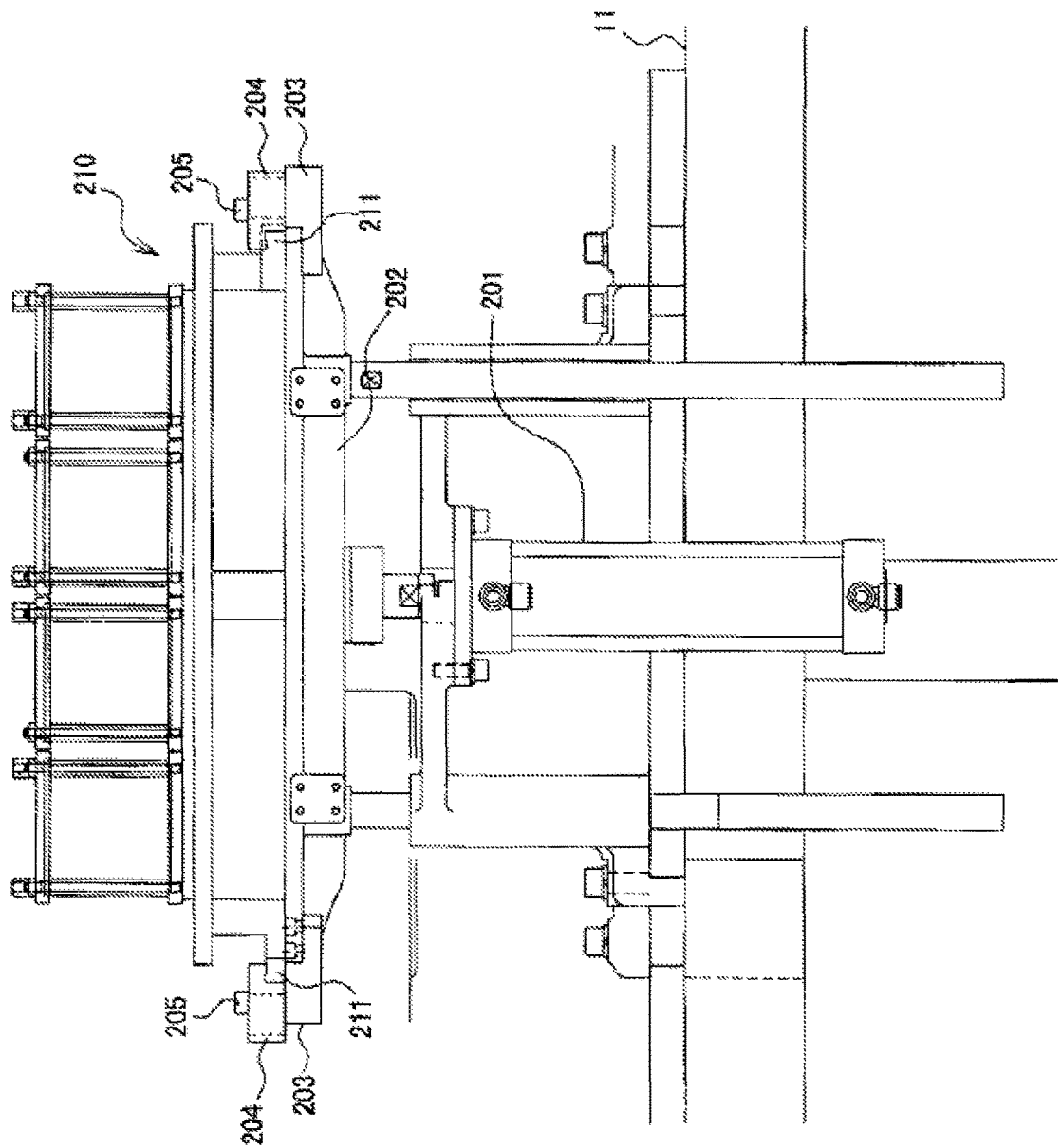
FIG. 12 shows a state where a temperature regulating pot is mounted.
Figure 13:
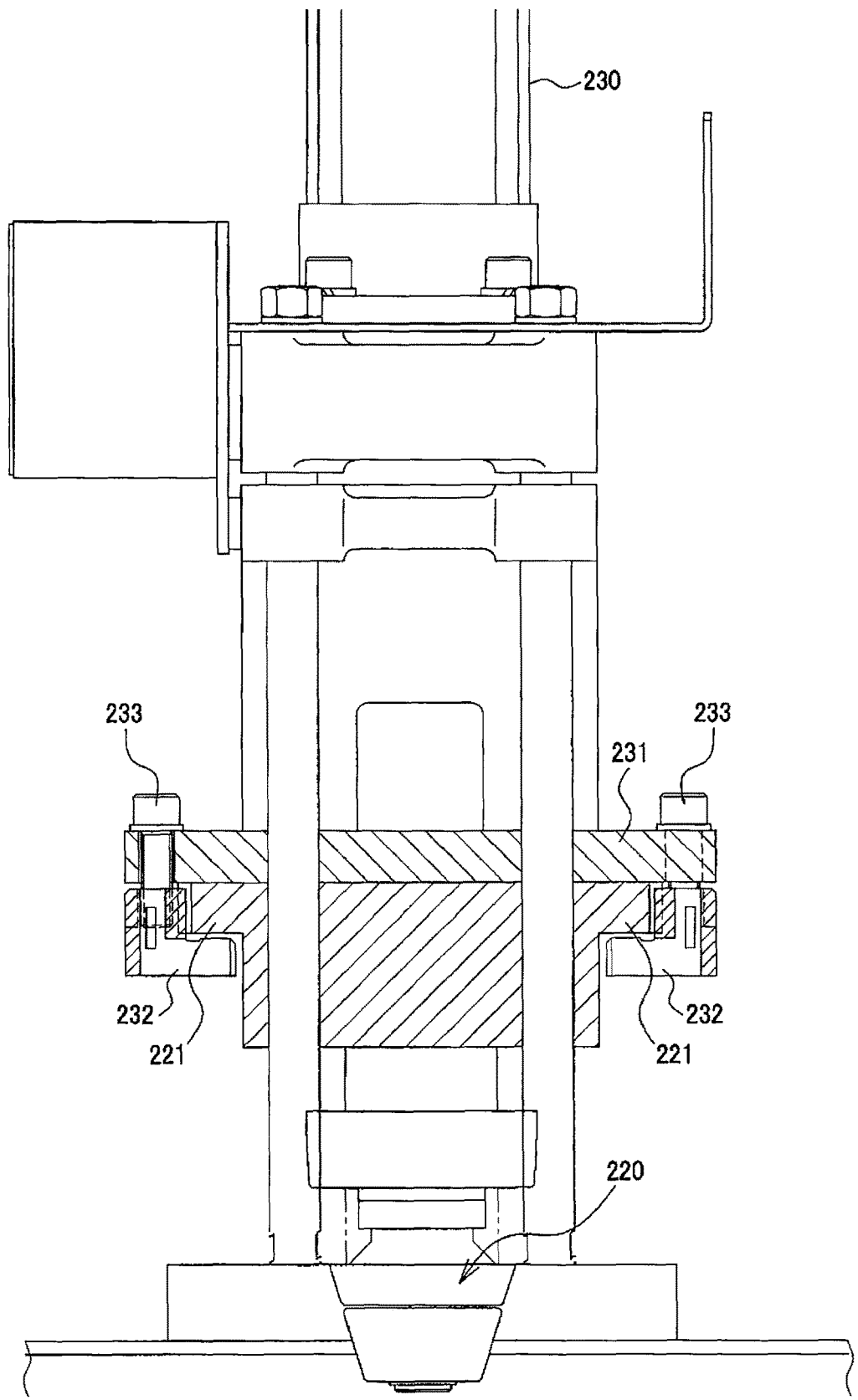
FIG. 13 shows a state where a temperature regulating core is mounted.

FIGS. 12 and 13 show how to mount a temperature regulating pot 210 (an example of a lower mold component) and a temperature regulating core 220 (an example of an upper mold component). As shown in FIG. 12, to a temperature regulating pot fixing base 202 to be lifted and lowered by an air cylinder 201 fixed to the lower base 11, there is fixed a mounting attachment 203 which includes a fixing attachment 204, for example, an L-shaped attachment 204 fixed by a bolt 205. The temperature regulating pot 210 includes projections 211 which are held by the mounting attachments 203 and L-shaped attachments 204, respectively. However, the mounting attachments 203 may also be formed integrally with the temperature regulating pot fixing base 202.

The L-shaped attachment 204 is permanently provided to the mounting attachment 203. By loosening the bolt 205 and rotating the L-shaped attachment 204 about the bolt 205 within a horizontal plane, the L-shaped attachment 204 can be received onto the upper surface of the temperature regulating pot fixing base 202 without interfering with the projection 211 of the temperature regulating pot 210. Next, after the L-shaped attachment 204 is rotated and set in a state shown in FIG. 12, by fastening the bolt 205, the temperature regulating pot 210 can be fixed. Here, the L-shaped attachment 204 may also be a fixing attachment which, similarly to the one used in the injection molding station 100, has a long-hole-shaped penetration hole for insertion of the bolt 205 and, after the bolt 205 is loosened, can be advanced and retreated within a horizontal plane.

As shown in FIG. 13, the temperature regulating core 220 inserted through a lip mold into the temperature regulating pot 210 includes a projection 221. A temperature regulating core fixing portion 231, which is lifted and lowered by an air cylinder 230 (an example of an upper elevation drive portion) fixed to the upper base 12, includes fixing attachments 232, for example, L-shaped attachments 232, connected thereto by bolts 233. The L-shaped attachments 232 are permanently provided to the temperature regulating core fixing portion 231. By loosening the bolts 233 and rotating the L-shaped attachments 232 about the bolt 233s within a horizontal plane, the L-shaped attachments 232 can be received onto the lower surface of the temperature regulating core fixing portion 231 without interfering with the projection 221 of the temperature regulating core 220. Next, after the L-shaped attachments 232 are rotated and set in a state shown in FIG. 13, by fastening the bolt 233, the temperature regulating core 220 can be fixed. Here, the temperature regulating core fixing portion 231 capable of lifting and lowering the temperature regulating core 220 is called an upper elevation portion, while the temperature regulating pot fixing base 202 capable of lifting and lowering the temperature regulating pot 210 is called a lower elevation portion.

Although not shown, in the temperature regulating station 200 as well, a mold component carry-in/carry-out device of either type of the above-mentioned first, second injection mold carry-in/carry-out devices 500, 600, or first, second blow mold carry-in/carry-out device 700, 800 can be permanently provided or can be removably provided and stored within the machine base 10.

Here, with respect to the temperature regulating pot 210 and temperature regulating core 220, similarly to the injection mold unit 110, by stacking them with the dummy lip plate 114 interposed therebetween, they can be carried in and out as a temperature regulating unit. In this case as well, after the temperature regulating pot 210 of the temperature regulating unit is fixed as shown in FIG. 12, before mounting the lip plate 14 and lip mold onto the transfer plate 13 supported by the upper base 12 of the blow molding machine, the air cylinders 201 (an example of a lower elevation drive portion) and 230 respectively shown in FIGS. 12 and 13 are driven to set the temperature regulating unit at the mold clamping position. At this time, since the lip plate 14 and lip mold are not mounted on the transfer plate 13, the hole 16 (see FIG. 6) capable of passing the temperature regulating core 220 therethrough is opened. Therefore, in the mold component mounting time, the transfer plate 13 is not lowered but, due to the lifting drive of the lower elevation portion, only the temperature regulating core 220 can be set through the hole of the transfer plate 13 at the upper position of the transfer plate 13, specifically, at the mold clamping position.

On the other hand, as described above, the temperature regulating core 220 of the temperature regulating unit is set at the mold clamping position by interposing the dummy lip plate 114. By lowering the temperature regulating core fixing portion 231 down to this mold clamping height position, the temperature regulating core 220 can be fixed to the temperature regulating core fixing portion 231.

5. Removal Station

Figure 14:
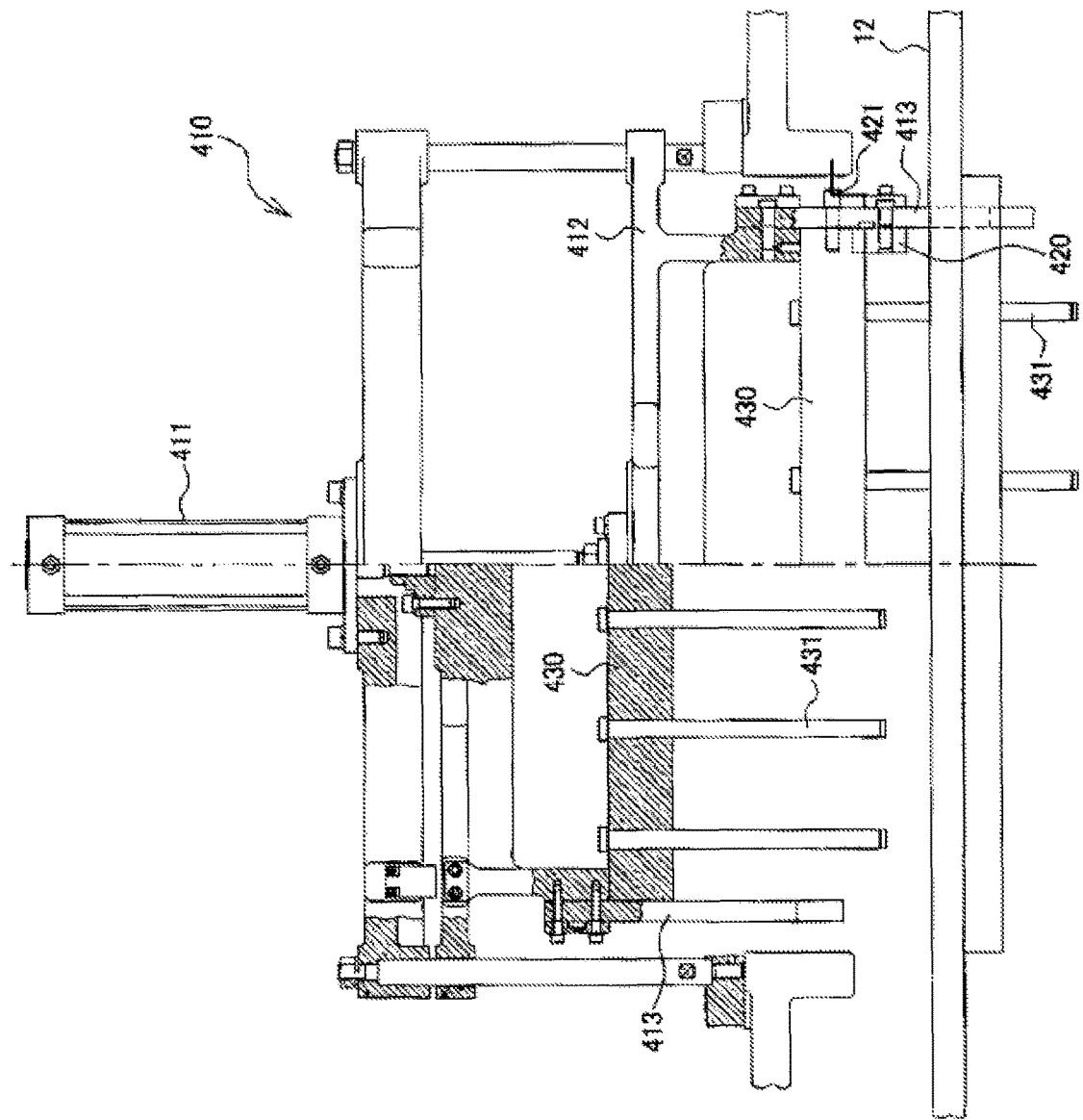
FIG. 14 is a front view of a removal device.
Figure 15:
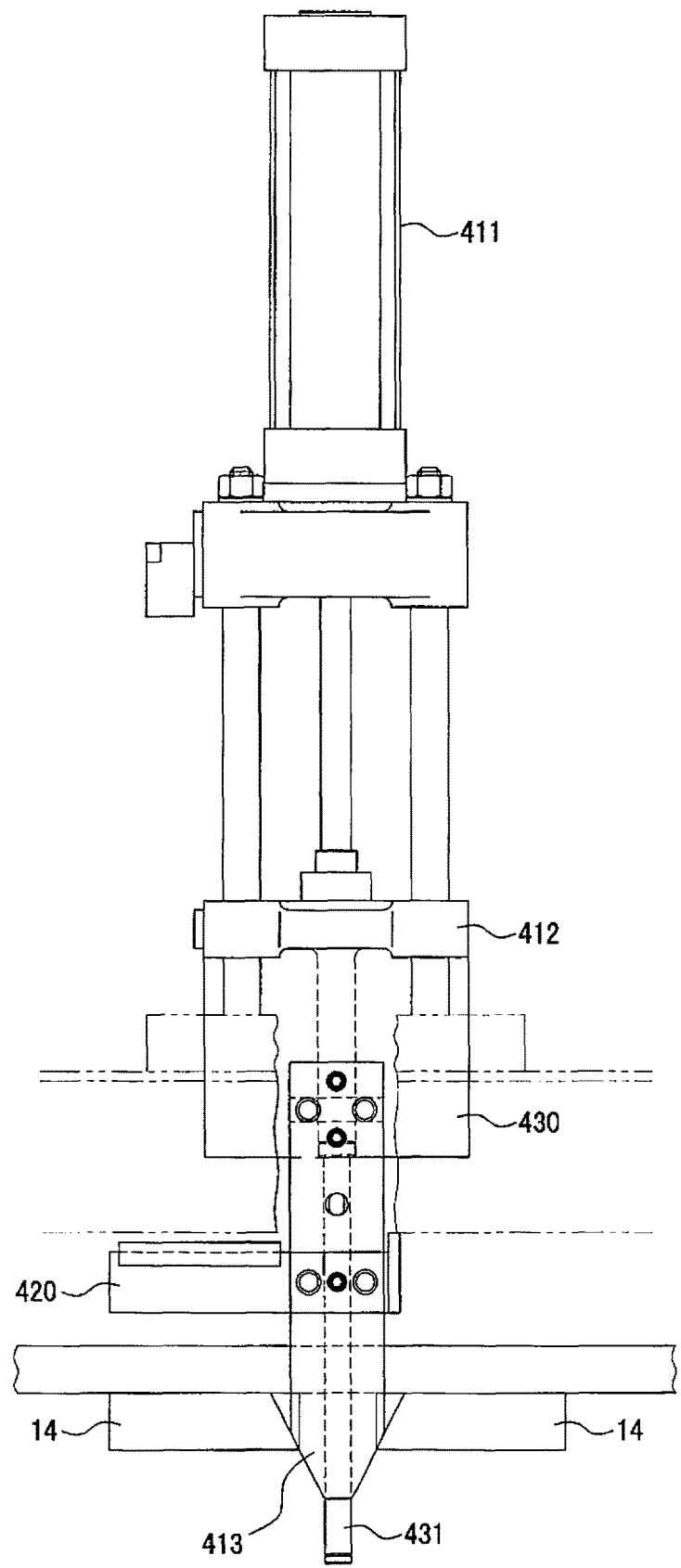
FIG. 15 is a side view of the removal device.

The removal station 400 shown in FIG. 1 supports a removal device 410 shown in FIGS. 14 and 15 on the upper base 12 side thereof. The removal device 410 includes eject plates 413 each having a wedge-shaped leading end which are fixed to the two sides of an elevation section 412 to be lifted and lowered by an air cylinder 411. When the eject plates 413, as shown in FIG. 15, are driven by the air cylinder 411 to lower together with the elevation section 412, they are inserted into the wedge holes of a pair of lip plates 14 to drive the paired lip plates 14 to open. This drive opens a pair of lip split molds (not shown) supported by the paired lip plates 14, thereby causing a blow molded container to fall down. In this embodiment, to the two eject plates 413, there are fixed rails 420 as support members (see FIG. 14).

An eject pin fixing plate 430 serving as a mold component has a plurality of eject pins 431 fixed thereto while they hang down therefrom. The eject pin fixing plate 430 is carried into a mounting position with its two ends carried on the rails 420. The eject pin fixing plate 430 can be fixed to the elevation section 412 when lock pins 421 are inserted from laterally of the two eject plates 413.

The number of components to be disposed in the removal station 400 is smaller than that of the injection molding station 100, temperature regulating station 200 and blow molding station 300. Thus, by using its empty space, as shown in FIG. 16, there is disposed a lip plate carry-in/carry-out device 900.

6. Lip mold carry-in/carry-out device

The lip plate carry-in/carry-out device 900 includes two first rails 910 which can swing about two fulcrum shafts 901 provided on the upper base 12. The two first rails 910 swing to a projecting position P9 and a storing position P10. The two first rails 910 respectively have slits 911 and, at the projecting position P9, bolts or lock pins 912 are inserted into the slits 911 to thereby fix the first rails to the upper base 12.

Figure 16:
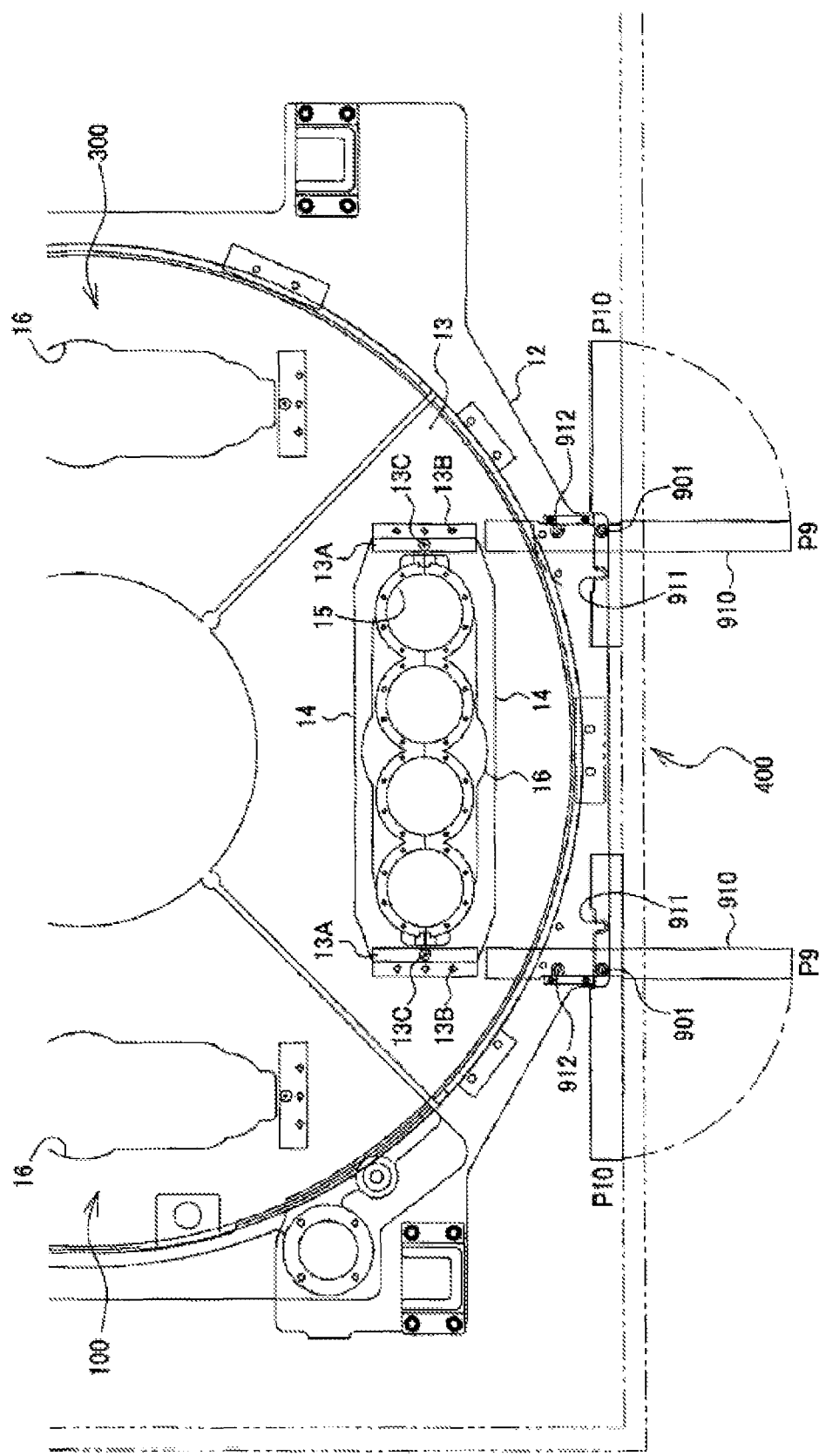
FIG. 16 is a planar view of a lip plate carry-in/carry-out device.
Figure 17:
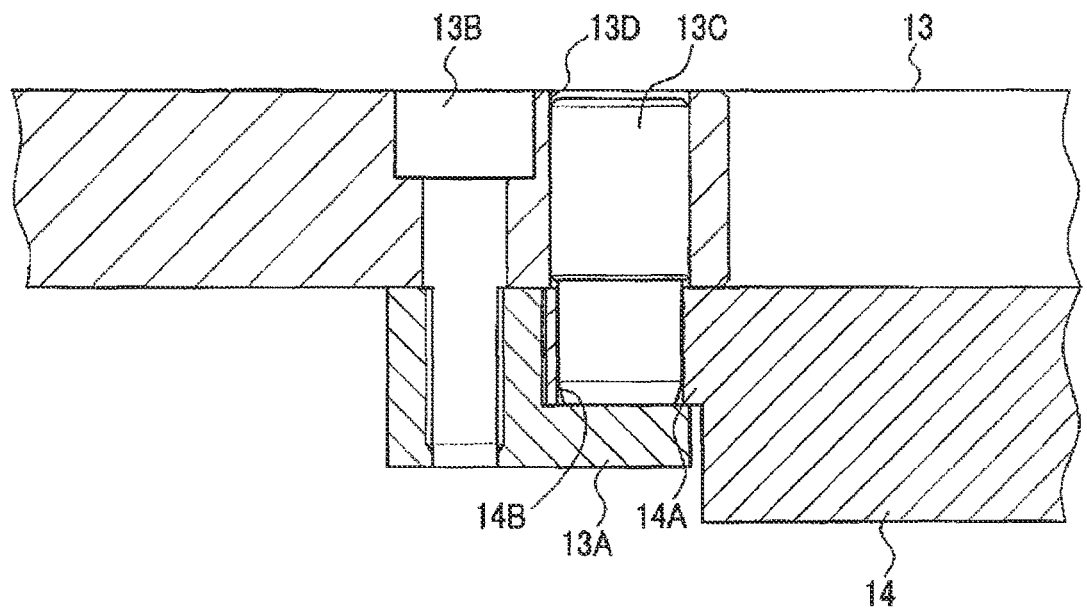
FIGS. 17(A) and (B) respectively show a state where a lip plate is mounted.
Figure 17:
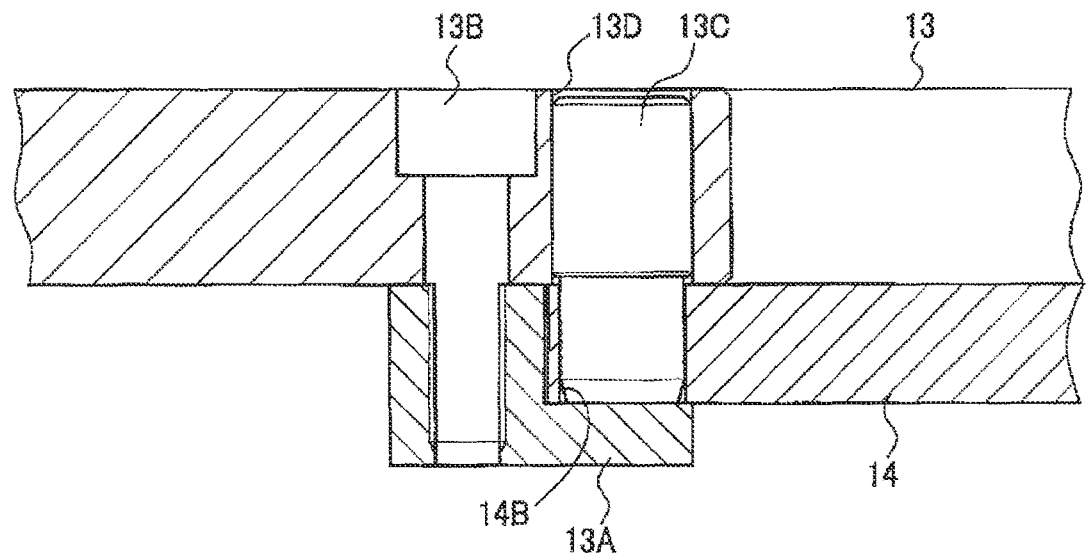

As shown in FIG. 17(A), two second rails 13A (only one is shown in FIG. 17(A)) for guiding a pair of lip plates 14 shown in FIG. 16 to open and close are disposed on the longitudinal-direction two ends of the paired lip plates 14 and are fixed by bolts 13B to the transfer plate 13 on which the paired lip plates 14 shown in FIG. 16 are supported. The paired lip plates 14 respectively include projections 14A which are projected from the longitudinal-direction two ends thereof. The projections 14A are to be loaded on the second rails 13A.

The second rail 13A shown in FIG. 17(A) is situated on the extension of the first rail 910 shown in FIG. 16 in the insertion direction of the lip plate 14. Therefore, when the lip plate 14 is carried in along the rail 910 with the projection 14A of the lip plate 14 loaded on the rail 910, the lip plate 14 can be slid into the second rail 13A. When a lip plate fixing attachment 13C, for example, a positioning pin 13C is inserted from above the transfer plate 13 through a hole 13D formed in the transfer plate 13 into a half-divided slit 14B formed in the projection 14A of the lip plate 14, the mounting of the lip plate 14 is completed. As disclosed in JP-A-H08-244103, conventionally, a positioning pin needed to be inserted into the positioning hole of a neck mold support plate (lip plate) from the lower side and next a member to prevent the fall of the positioning pin must be bolt fastened to the rail. Thus, when the number of lip plates used increases, the time necessary for the operation to fix the lip plates tends to increase. Also, although there is provided a fall preventive member as measures to prevent the positioning pin against removal, when the cycle speed (bottle production speed) increases, loads are applied to the positioning pin and fall preventive member, thereby raising a fear that they will be shifted in position or will be removed. With such phenomenon, the neck mold support plate (lip plate) is also caused to shift in position, whereby a mold component or machine component can be damaged in the mold clamping time. Further, such unexpected damage and failure can put an operator in danger. In this embodiment, since the positioning pin 13C is inserted from the upper side and is supported by the rail 13A, the fear of the position shift and fall can be improved greatly. Also, the time necessary for the carry-in/carry-out operation of the lip plates 14 and the maintenance thereof can be reduced, thereby being able to enhance the efficiency of the operation greatly.

Instead of FIG. 17(A), as shown in FIG. 17(B), the lip plate 14 can also be formed of a flat plate with no level difference in the thickness direction. In this case, the longitudinal-direction two ends of the lip plate 14 are loaded on the second rail 13A.

Although description has been given specifically of the embodiment, it is easy for a person skilled in the art to understand that various modifications are possible without departing substantially from the new matters and effects of the invention. Therefore, such modifications are to fall under the scope of the invention. For example, any terms used at least once together with different terms of broader or synonymous sense in the specification or drawings can be replaced with such different terms in any portions of the specification and drawings.

The present application is based on Japanese Patent Application No. 2011-233452 filed on Oct. 24, 2011 and Japanese Patent Application No. 2012-231478 filed on Oct. 19, 2012, and the contents thereof are incorporated herein for reference.

DESCRIPTION OF REFERENCE NUMERALS AND SIGNS

10: machine base
11: lower base
12: upper base
13: transfer plate
13A: second rail
14: lip plate
14A: projection
20: first fixed fulcrum shaft
21: second fixed fulcrum shaft
22: fixed fulcrum shaft
23: first fixed fulcrum shaft
24: second fixed fulcrum shaft
25: fixed fulcrum shaft
100: injection molding station
101: movable tie bar
102: mold clamping plate
111: hot runner mold
112: injection cavity mold
113: injection core mold
114: dummy lip plate
110: injection mold unit
200: temperature regulating station
300: blow molding station
400: removal station
500: first injection mold carry-in/carry-out device
510: support member
511: base end portion
512: free end portion
513: first movable fulcrum shaft
520: moving mechanism
521, 522: link
521A, 522A: first support hole
521B: second support hole
530: first angle fixing tool
531: first angle fixing plate
532, 533: fulcrum shaft
534, 535: first pin
534A, 535A: first insertion hole
534B, 535B; second insertion hole
540: support reinforcing member
550: second angle fixing tool
551: second angle fixing plate
552: second pin
552A: third insertion hole
552B: fourth insertion hole
600: second injection mold carry-in/carry-out device
610: support member
610A, 610B: rail
611: movable fulcrum shaft
620: moving mechanism
630: first angle fixing tool
640: second angle fixing tool
700: first blow mold carry-in/carry-out device
710: support member
711: base end portion
712: free end portion
713: first movable fulcrum shaft
720: moving mechanism
721, 722: link
730: first angle fixing tool
740: support reinforcing member
750: second angle fixing tool
760: third angle fixing tool
800: second blow mold carry-in/carry-out device
810: support member
810A, 810B: rail
811: movable fulcrum shaft
820: moving mechanism
830: first angle fixing tool
840: second angle fixing tool
900: lip plate carry-in/carry-out device
901: fulcrum shaft
910: first rail
P1, P3, P5, P7, P9: projecting position
P2, P4, P6, P8, P10: storing position

The invention claimed is:

1. A mold unit attachable to a rotation transfer type blow molding machine of a hot parison system, the blow molding machine including an eject plate, the mold unit comprising:
an eject pin fixing plate configured to be coupled to the eject plate, and
a mold for blow molding,
wherein the mold unit is used in a removal station of the blow molding machine, wherein the eject plate is used for removing a molded product produced by the mold for blow molding, wherein the eject pin fixing plate has a plurality of eject pins fixed thereto, the eject pins being configured to push the molded product molded by the mold for blow molding the eject pin fixing plate being a part of the mold unit, wherein the eject pin fixing plate has a side face and a lateral face, the side face is longer in length than the lateral face, and the lateral face has a recess into which a lock pin is insertable, whereby the lock pin may be inserted into the recess via a through hole provided on a lateral surface of the eject plate.

2. The mold unit according to claim 1, further comprising a pair of lip plates into which a tip end of the eject plate is insertable.

3. The mold unit according to claim 2, wherein the lip plates include a lip mold, and wherein the mold unit further comprises at least one of a mold for injection molding, and a mold for temperature regulating, which are in contact with the lip mold.

4. The mold unit according to claim 1, wherein the eject pins extend in an axial direction and the lateral of the eject pin fixing plate is in a plane parallel to the axial direction of the eject pins.

5. The mold unit according to claim 1, wherein the recess has an axis in a horizontal direction and the eject pins extend in an axial direction downward, normal to the horizontal direction, and the lateral of the eject pin fixing plate is in a vertical plane parallel to the axial direction of the eject pins.

* * * * *